(12) United States Patent
Tsushima et al.

(10) Patent No.: US 12,333,780 B2
(45) Date of Patent: Jun. 17, 2025

(54) MIGRATION SYSTEM OF LEARNING MODEL FOR CELL IMAGE ANALYSIS AND MIGRATION METHOD OF LEARNING MODEL FOR CELL IMAGE ANALYSIS

(71) Applicant: SHIMADZU CORPORATION, Kyoto (JP)

(72) Inventors: Hiroaki Tsushima, Kyoto (JP); Ryuji Sawada, Kyoto (JP); Takeshi Ono, Kyoto (JP); Shuhei Yamamoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 470 days.

(21) Appl. No.: 17/959,800

(22) Filed: Oct. 4, 2022

(65) Prior Publication Data

US 2023/0111880 A1    Apr. 13, 2023

(30) Foreign Application Priority Data

Oct. 8, 2021   (JP) ................. 2021-166341

(51) Int. Cl.
| | |
|---|---|
| G06K 9/00 | (2022.01) |
| G06T 7/00 | (2017.01) |
| G06V 10/72 | (2022.01) |
| G06F 21/60 | (2013.01) |

(52) U.S. Cl.
CPC ............ G06V 10/72 (2022.01); G06T 7/0012 (2013.01); *G06F 21/602* (2013.01); *G06T 2207/10056* (2013.01); *G06T 2207/20081* (2013.01); *G06T 2207/30024* (2013.01)

(58) Field of Classification Search
CPC .................. G06V 10/72; G06T 7/0012; G06T 2207/10056; G06T 2207/20081; G06T 2207/30024; G06F 21/602
See application file for complete search history.

(56) References Cited

U.S. PATENT DOCUMENTS

| | | | | |
|---|---|---|---|---|
| 7,890,475 | B2* | 2/2011 | Demuth ................... | G06F 8/61 |
| | | | | 717/177 |
| 11,327,675 | B2* | 5/2022 | Swamy ................ | G06F 3/0607 |
| 11,507,297 | B2* | 11/2022 | Lee ...................... | G06F 3/0614 |
| 2021/0110536 | A1 | 4/2021 | Akazawa | |

FOREIGN PATENT DOCUMENTS

| | | | | |
|---|---|---|---|---|
| CN | 1740993 | A | * | 3/2006 |
| CN | 113312338 | A | * | 8/2021 ........... G06F 16/214 |
| JP | 2021-064115 | A | | 4/2021 |

* cited by examiner

*Primary Examiner* — Shervin K Nakhjavan
(74) *Attorney, Agent, or Firm* — Sughrue Mion, PLLC

(57) ABSTRACT

A migration system of a learning model for cell image analysis is a system that migrates a learning model from a first learning device to a second learning device, in which the second learning device includes an algorithm consistency determination unit that determines, based on second algorithm specification information and first algorithm specification information, whether or not consistency is established between a first algorithm and a second algorithm, and a learning model parameter setting unit that sets a first parameter to be used together with the second algorithm.

11 Claims, 10 Drawing Sheets

MIGRATION SYSTEM OF LEARNING MODEL FOR CELL IMAGE ANALYSIS AND MIGRATION METHOD OF LEARNING MODEL FOR CELL IMAGE ANALYSIS

CROSS-REFERENCE TO RELATED APPLICATIONS

The priority application number JP2021-166341, MIGRATION SYSTEM OF LEARNING MODEL FOR CELL IMAGE ANALYSIS AND MIGRATION METHOD OF LEARNING MODEL FOR CELL IMAGE ANALYSIS, Oct. 8, 2021, TSUSHIMA, Hiroaki, SAWADA Ryuji, ONO Takeshi, YAMAMOTO Shuhei, upon which this patent application is based are here by incorporated by reference.

BACKGROUND OF THE INVENTION

Field of the Invention

The present invention relates to a migration system of a learning model for cell image analysis and a migration method of a learning model for cell image analysis.

Background Art

In the related art, a technique for generating a learning model for analyzing a cell image has been disclosed. A technique for generating a learning model for analyzing such a cell image is disclosed in, for example, JP-A-2021-64115.

JP-A-2021-64115 discloses a cell analysis device that generates a trained model by performing machine learning by using learning data, in which a cell image is used as an input image and a stain image that is obtained by staining a cytoskeleton is used as a correct answer image.

Although not disclosed in JP-A-2021-64115, there may be a desire to migrate a learning model for cell image analysis to a learning device (a second learning device) located at a base that is different from a base where the cell image analysis device (a first learning device), in which the trained model is generated, is installed, such as relocation of bases or the like. In this case, by duplicating data, such as an algorithm of a learning model used for analysis of a cell image in the first learning device that is a migration source and a parameter (a first parameter) used for the analysis, in the second learning device that is a migration destination, the learning model can be migrated from the first learning device to the second learning device.

However, it may not be possible to duplicate the algorithm of the learning model as it is from the viewpoint of license or the like. In this case, by storing the same algorithm as the first learning device that is the migration source and by migrating only the first parameter in the second learning device that is the migration destination, the learning model can be migrated from the first learning device to the second learning device. However, when migrating only the first parameter used for analysis to the second learning device in which the same algorithm as the first learning device is stored, the first parameter may not be applied to the second learning device due to differences in algorithm versions. In this case, in the second learning device, it is necessary to perform learning by using the stored algorithm, and it is difficult to easily migrate the learning model. Therefore, a technique capable of easily migrating a learning model is desired.

SUMMARY OF THE INVENTION

The present invention has been made to solve the above-mentioned problems, and one object of the present invention is to provide a migration system of a learning model for cell image analysis and a migration method of a learning model for cell image analysis capable of easily migrating the learning model.

In order to achieve the above object, a migration system of a learning model for cell image analysis in a first aspect of the present invention is a migration system of a learning model for cell image analysis that migrates a learning model used for analyzing a cell image from a first learning device to a second learning device, in which the second learning device includes a migration information input reception unit that receives an input of learning model migration information including first algorithm specification information for specifying a first algorithm of the learning model used for analyzing the cell image and a first parameter, which is output when the learning model is generated and is a learning parameter when the cell image is analyzed by using the learning model, a second learning device storage unit that stores a second algorithm of the learning model used for analyzing the cell image, an algorithm consistency determination unit that determines, based on second algorithm specification information for specifying the second algorithm stored in the second learning device storage unit and the first algorithm specification information, whether or not consistency is established for estimation results, which are obtained when the first parameter is used, between the first algorithm and the second algorithm, a notification unit that makes a notification of whether or not the consistency is established between the first algorithm and the second algorithm, and a learning model parameter setting unit that sets, when the consistency is established between the first algorithm and the second algorithm, the first parameter to be used together with the second algorithm.

A migration method of a learning model for cell image analysis according to a second aspect of the present invention is a migration method of a learning model for cell image analysis of migrating a learning model used for analyzing a cell image from a first computer to a second computer, the migration method includes: receiving an input of learning model migration information including first algorithm specification information for specifying a first algorithm of the learning model used for analyzing the cell image and a first parameter, which is output when the learning model is generated and is a learning parameter when the cell image is analyzed by using the learning model, by the second computer; determining, based on a second algorithm stored in a storage unit and the first algorithm specification information included in the learning model migration information, whether or not consistency is established for estimation results, which are obtained when the first parameter is used, between the first algorithm and the second algorithm, by the second computer; making a notification of whether or not the consistency is established between the first algorithm and the second algorithm, by the second computer; and setting, when the consistency is established between the first algorithm and the second algorithm, the first parameter to be used together with the second algorithm, by the second computer.

In the migration system of a learning model for cell image analysis according to the first aspect and the migration method of a learning model for cell image analysis according to the second aspect, it is determined whether or not consistency is established for estimation results, which are obtained when the first parameter that is used for analyzing the cell image is used between the first algorithm of the first learning device and the second algorithm of the second learning device. Further, when the consistency is established between the first algorithm and the second algorithm, the first parameter is set in the second learning device. Therefore, the first parameter can be set in the second learning device without performing the same learning as in the first learning device in the second learning device. As a result, the learning model can be easily migrated. Further, when the consistency is not established between the first algorithm and the second algorithm, the notification is made that the consistency is not established between the first algorithm and the second algorithm. Therefore, the user can grasp that the consistency is not established between the first algorithm of the first learning device, which is a migration source, and the second algorithm of the second learning device, which is a migration destination, and can grasp the reason why the learning model cannot be migrated. As a result, the user convenience can be improved.

DETAILED DESCRIPTION OF THE INVENTION

Hereinafter, an embodiment that specifies the present invention will be described with reference to the drawings.

A configuration of a migration system 200 of a learning model for cell image analysis and a migration method of a learning model for cell image analysis according to the present embodiment will be described with reference to FIGS. 1 to 12.

Migration System of Learning Model for Cell Image Analysis

Figure 1:
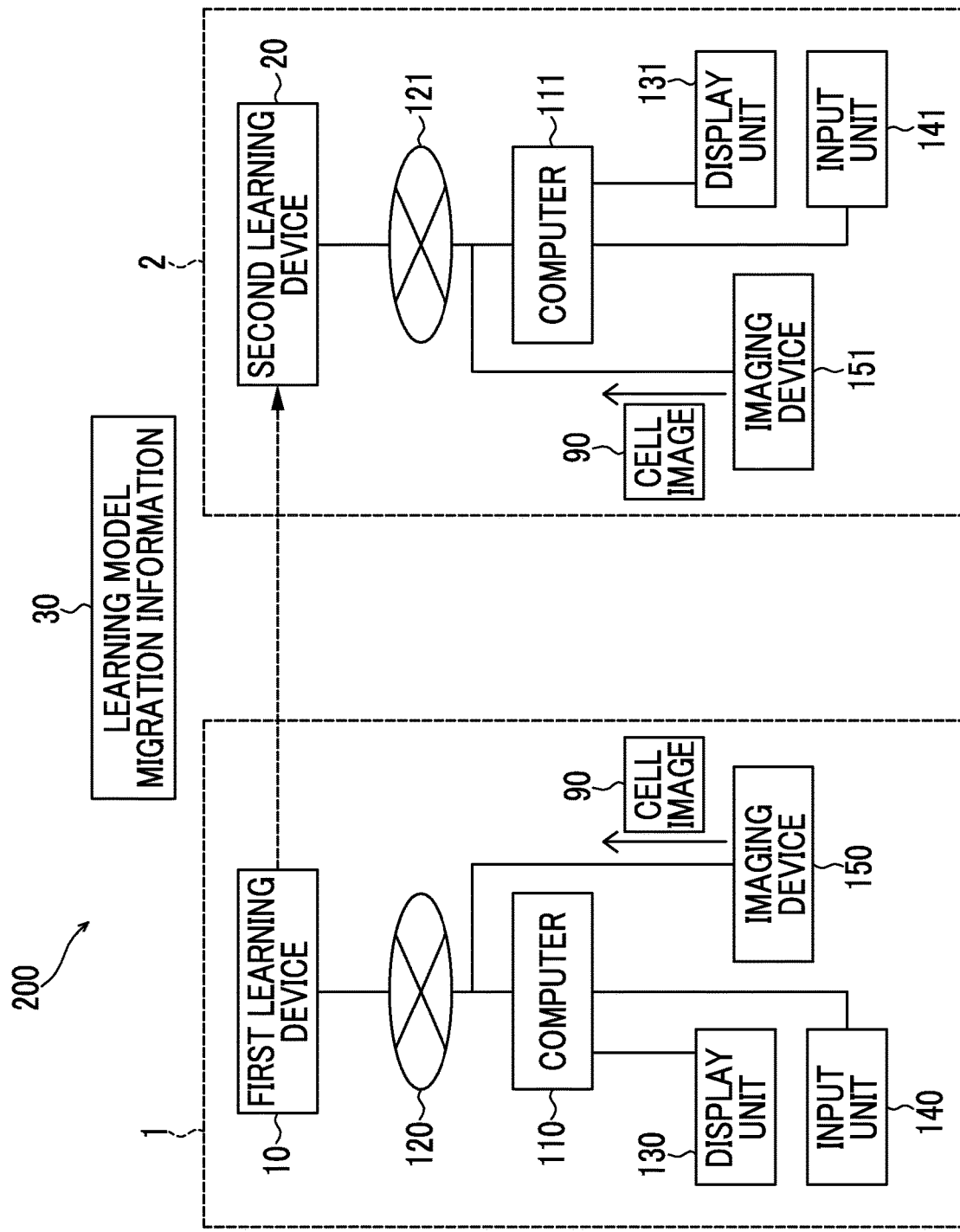
FIG. 1 is a block diagram illustrating a migration system of a learning model for cell image analysis according to the present embodiment.

The migration system 200 of a learning model for cell image analysis illustrated in FIG. 1 is a system that migrates a learning model used for the analysis of a cell image 90 from a first learning device 10 to a second learning device 20. The first learning device 10 is installed at a first base 1. Further, the second learning device 20 is disposed at a second base 2 that is different from the first base 1. The learning model is a learning model for performing an analysis process on the cell image 90 captured by a user who performs cell culture or the like.

The migration system 200 of a learning model for cell image analysis includes the first learning device 10 and the second learning device 20. Further, the migration system 200 of a learning model for cell image analysis includes a computer 110, a computer 111, an imaging device 150, and an imaging device 151.

FIG. 1 illustrates an example of migrating the learning model, in a client-server system in which the first learning device 10 functions as a server and the computer 110 functions as a client terminal, and a client-server system in which the second learning device 20 functions as a server and the computer 111 functions as a client terminal. The first learning device 10, the computer 110, and the imaging device 150 are connected to each other to be able to communicate with each other via a network 120. Further, the second learning device 20, the computer 111, and the imaging device 151 are connected to each other to be able to communicate with each other via a network 121.

The first learning device 10 performs various information processes in response to a request (process request) from the computer 110 operated by the user. The first learning device 10 performs training of the learning model for analyzing the cell image 90 in response to a request. In the present embodiment, the first learning device 10 trains the learning model to classify cells shown in the cell image 90. For example, the first learning device 10 trains the learning model to perform classification of whether or not the cells shown in the cell image 90 are normal or perform classification of whether or not the cells shown in the cell image 90 are aging.

Further, the first learning device 10 performs an output process (an export process) of the learning model migration information 30 in response to a request. Reception of an operation with respect to the first learning device 10, and display of an analysis result that is analyzed by the first learning device 10 and an image after the analysis are performed on a graphical user interface (GUI) that is displayed on a display unit 130 of the computer 110.

The second learning device 20 performs various information processes in response to a request (process request) from the computer 111 operated by the user. The second learning device 20 performs training of the learning model for analyzing the cell image 90 in response to a request. In the present embodiment, the second learning device 20 trains the learning model to classify cells shown in the cell image 90. For example, the second learning device 20 trains the learning model to perform classification of whether or not the cells shown in the cell image 90 are normal or perform classification of whether or not the cells shown in the cell image 90 are aging.

Further, the second learning device 20 performs an input process (an import process) of the learning model migration information 30 in response to a request. Reception of an operation with respect to the second learning device 20, and display of an analysis result that is analyzed by the second learning device 20 and an image after the analysis are performed on a GUI that is displayed on a display unit 131 of the computer 111.

The network 120 connects the first learning device 10, the computer 110, and the imaging device 150 to be able to communicate with each other. The network 120 may be, for example, a local area network (LAN) built inside the first base 1. Therefore, the second learning device 20 cannot be directly accessed from the computer 110.

The network 121 connects the second learning device 20, the computer 111, and the imaging device 151 to be able to communicate with each other. The network 121 may be, for example, a LAN built inside the second base 2 different from the first base 1 in which the first learning device 10 is installed. Therefore, the first learning device 10 cannot be directly accessed from the computer 111.

The computer 110 and the computer 111 are so-called personal computers, which include a processor and a storage unit. The display unit 130 and an input unit 140 are connected to the computer 110. Further, the display unit 131 and an input unit 141 are connected to the computer 111.

The display unit 130 and the display unit 131 are, for example, liquid crystal display devices. The display unit 130 and the display unit 131 may be electroluminescence display devices, projectors, or head-mounted displays. In the present embodiment, the display unit 131 is configured to provide notification of whether or not consistency is established between a first algorithm 40 (see FIG. 2) and a second algorithm 50 (see FIG. 5), which will be described later. Specifically, the display unit 131 is configured to provide notification by displaying the notification content 91 (see FIG. 7), which will be described later. The display unit 131 is an example of a "notification unit" in the claims.

The input unit 140 and the input unit 141 are input devices including, for example, a mouse and a keyboard. The input unit 140 and the input unit 141 may be touch panels. One or a plurality of computers 110 are provided in the migration system 200 of a learning model for cell image analysis. Further, one or a plurality of computers 111 are provided in the migration system 200 of a learning model for cell image analysis.

The imaging device 150 and the imaging device 151 generate the cell image 90 in which cells are imaged. The imaging device 150 can transmit the generated cell image 90 to the computer 110 and/or the first learning device 10 via the network 120. The imaging device 150 captures a microscopic image of cells. The imaging device 150 performs imaging by using an imaging method such as a bright field observation method, a dark field observation method, a phase contrast observation method, and a differential interference contrast observation method. Depending on the imaging method, one or a plurality of imaging devices 150 are used. The migration system 200 of a learning model for cell image analysis may be provided with one or a plurality of imaging devices 150.

The imaging device 151 can transmit the generated cell image 90 to the computer 111 and/or the second learning device 20 via the network 121. The imaging device 151 captures a microscopic image of cells. The imaging device 151 performs imaging by using an imaging method such as a bright field observation method, a dark field observation method, a phase contrast observation method, and a differential interference contrast observation method. Depending on the imaging method, one or a plurality of imaging devices 151 are used. The migration system 200 of a learning model for cell image analysis may be provided with one or a plurality of imaging devices 151.

First Learning Device

Figure 2:
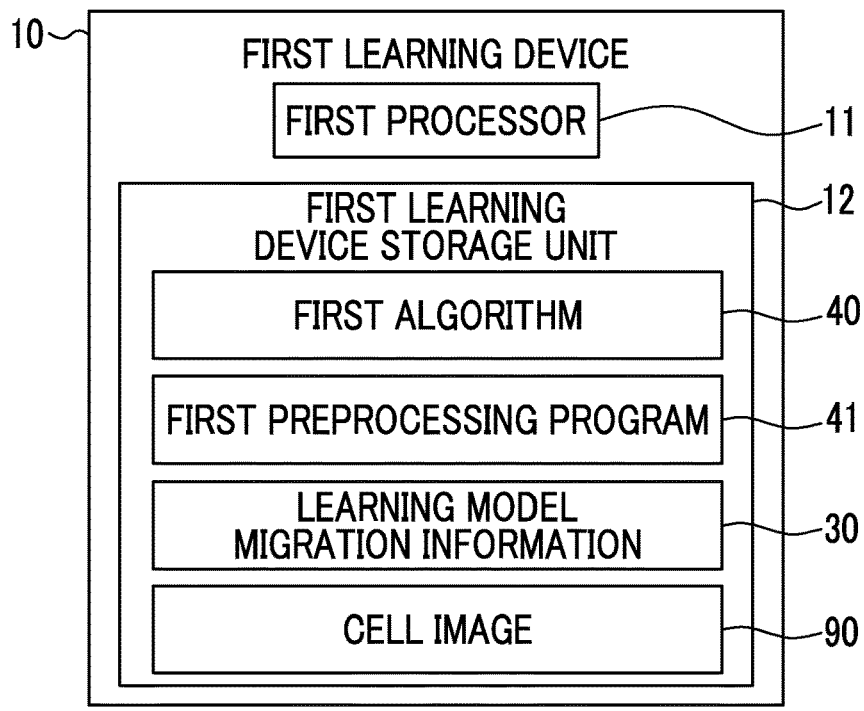
FIG. 2 is a block diagram for describing a configuration of a first learning device.

As illustrated in FIG. 2, the first learning device 10 includes a first processor 11 and a first learning device storage unit 12.

The first processor 11 performs a calculation process as the first learning device 10 by executing a predetermined program. The first processor 11 includes a central processing unit (CPU), a graphics processing unit (GPU), a field-programmable gate array (FPGA), an application specific integrated circuit (ASIC), and the like. In the present embodiment, the first processor 11 is configured to perform training of the learning model by using the first algorithm 40. Further, the first processor 11 is configured to perform the export process of the learning model migration information 30. The details of the configuration in which the first processor 11 performs the export process of the learning model migration information 30 will be described later.

The first learning device storage unit 12 includes a non-volatile storage device. The non-volatile storage device is, for example, a hard disk drive, a solid state drive, or the like. The first learning device storage unit 12 is configured to store the learning model migration information 30. Further, the first learning device storage unit 12 stores the first algorithm 40 and a first preprocessing program 41. Further, the first learning device storage unit 12 stores the cell image 90.

The first algorithm 40 is an algorithm of the learning model used for the analysis of the cell image 90. The first algorithm 40 is an analysis method used when the analysis of the cell image 90 is performed. The first algorithm 40 includes, for example, U-NET. Further, the first algorithm 40 is used when the cell image 90 is analyzed in the first learning device 10.

The first preprocessing program 41 is a preprocessing program for the cell image 90 when the learning model is trained. In the present embodiment, the first preprocessing program 41 includes, for example, a program for correcting the luminance unevenness generated in the background of the cell image 90. Further, the first preprocessing program 41 is used for preprocessing the cell image 90 when the cell image 90 is analyzed in the first learning device 10.

Learning Model Migration Information

Figure 3:
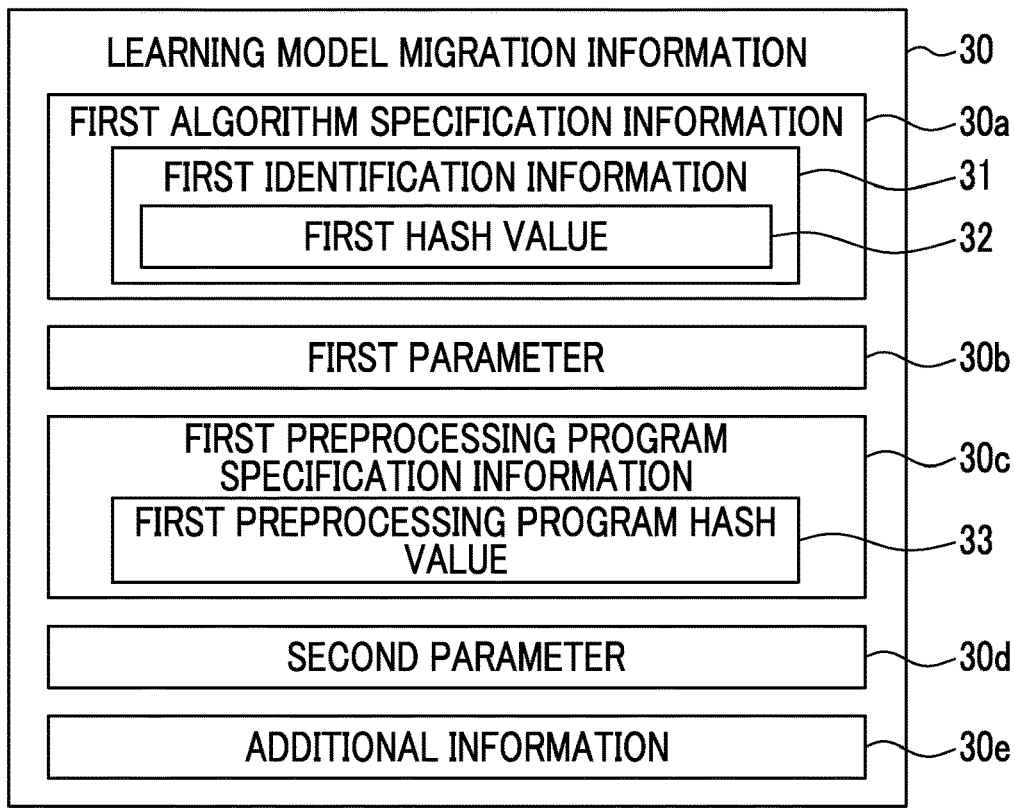
FIG. 3 is a diagram for describing learning model migration information.

Next, the details of the learning model migration information 30 will be described with reference to FIG. 3. The learning model migration information 30 includes the first algorithm specification information 30a, a first parameter 30b, a first preprocessing program specification information 30c, a second parameter 30d, and an additional information 30e. The first preprocessing program specification information 30c is an example of a "preprocessing program specification information" in the claims.

The first algorithm specification information 30a is information for specifying the first algorithm 40. In the present embodiment, the first algorithm specification information 30a includes a first identification information 31 corresponding to the first algorithm 40. In the present embodiment, the first identification information 31 includes a first hash value 32 generated based on the first algorithm 40.

The first hash value 32 is acquired by the first processor 11 and stored in the first learning device storage unit 12. The first processor 11 acquires the first hash value 32 from the first algorithm 40 by using, for example, a hash function. The first processor 11 acquires the first hash value 32 based on data that cannot be changed by the user, not the data that can to be changed by the user. That is, the first processor 11 acquires the first hash value 32 based on a source code or the like of the first algorithm 40, not a file name or the like of the first algorithm 40. The first hash value 32 becomes a different value from the previous first hash value 32 when the source code or the like of the first algorithm 40 becomes different even by one character.

The first parameter 30b is a learning parameter that is output when the learning model is generated and is used when the cell image 90 is analyzed by the learning model. Specifically, the first parameter 30b is a weight parameter used when the cell image 90 is analyzed. The first parameter 30b is acquired by the first processor 11 training the learning model by using the first algorithm 40.

The first preprocessing program specification information 30c is information for specifying the first preprocessing program 41. In the present embodiment, the first preprocessing program specification information 30c includes a first preprocessing program hash value 33 acquired based on the first preprocessing program 41 (see FIG. 2). The first preprocessing program hash value 33 is acquired from the first preprocessing program 41, for example, by the first processor 11 using a hash function. The first processor 11 acquires the first preprocessing program hash value 33 based on data that cannot be changed by the user, not the data that can be changed by the user. That is, the first processor 11 acquires the first preprocessing program hash value 33 based on a source code or the like of the first preprocessing program 41, not a file name of the first preprocessing program 41. The first preprocessing program hash value 33 becomes a different value from the previous first preprocessing program hash value 33 when the source code or the like of the first preprocessing program 41 becomes different even by one character.

The second parameter 30d is a parameter corresponding to the first preprocessing program 41. Specifically, the second parameter 30d is a value set by the user when the first processor 11 performs the preprocessing on the cell image 90 (see FIG. 1) by using the first preprocessing program 41.

The additional information 30e is information when the first processor 11 performs learning of the first algorithm 40. The additional information 30e includes information about a learning condition, which is set when the training of the learning model is performed by the user in the first learning device 10, verification results of the learning, and the like.

Additional Information

Figure 4:
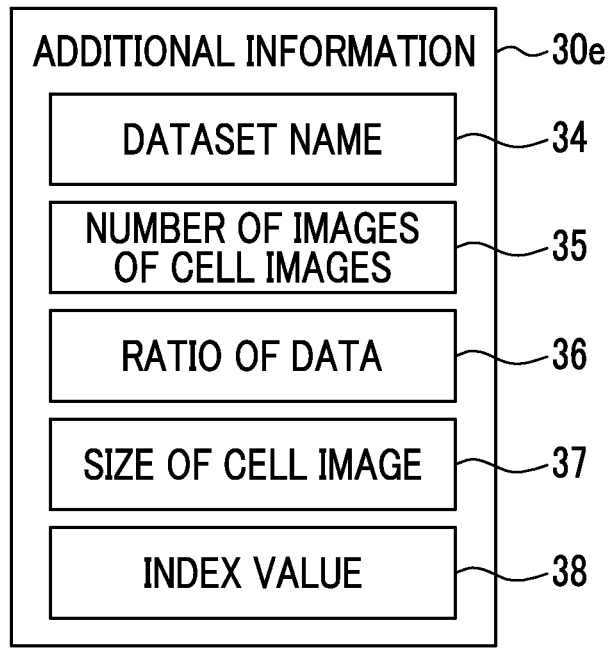
FIG. 4 is a diagram for describing additional information.

As illustrated in FIG. 4, the additional information 30e includes at least one of a name of dataset 34 used for training the learning model, the number of images 35 of the cell images 90 used for training the learning model, a ratio 36 of training data, verification data, and test data in the data used for training the learning model, a size 37 of the cell image 90 used for training the learning model, and an index value 38 at the time of training the learning model. In the present embodiment, the additional information 30e includes all of the name of dataset 34, the number of images 35 of the cell image 90, the ratio 36 of the training data, the verification data, and the test data, the size 37 of the cell image 90, and the index value 38 at the time of training the learning model.

Second Learning Device

Figure 5:
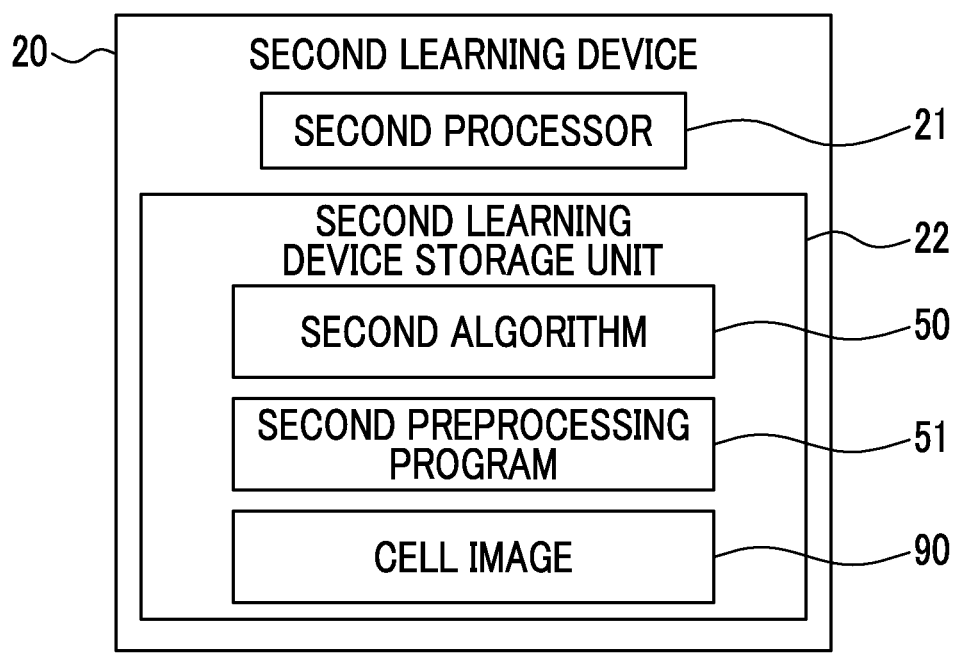
FIG. 5 is a block diagram for describing a configuration of a second learning device.

As illustrated in FIG. 5, the second learning device 20 includes a second processor 21 and a second learning device storage unit 22.

The second processor 21 performs a calculation process as the second learning device 20 by executing a predetermined program. The second processor 21 includes a CPU, GPU, FPGA, ASIC, and the like. In the present embodiment, the second processor 21 trains the learning model to analyze the cell image 90 by using the second algorithm 50. Further, the second processor 21 is configured to perform the import process of the learning model migration information 30. The details of the configuration in which the second processor 21 performs the import process of the learning model migration information 30 will be described later.

The second learning device storage unit 22 includes a volatile storage device. The non-volatile storage device is, for example, a hard disk drive, a solid state drive, or the like. The second learning device storage unit 22 is configured to store the second algorithm 50 of the learning model used for the analysis of the cell image 90. Further, the second learning device storage unit 22 is configured to store a second preprocessing program 51, which is a preprocessing program for the cell image 90. Further, the second learning device storage unit 22 is configured to store the cell image 90.

The second algorithm 50 is an algorithm of the learning model used for the analysis of the cell image 90. The second algorithm 50 is the same algorithm as the first algorithm 40. In the present embodiment, the second algorithm 50 includes, for example, U-NET. The second algorithm 50 is acquired separately from the first algorithm 40 and is stored in advance in the second learning device storage unit 22.

The second preprocessing program 51 is a preprocessing program for the cell image 90 when the learning model is trained. The second preprocessing program 51 is a program for performing the same preprocessing as the first preprocessing program 41. In the present embodiment, the second preprocessing program 51 includes, for example, a program for correcting the luminance unevenness generated in the background of the cell image 90. The second preprocessing program 51 is acquired separately from the first preprocessing program 41 and is stored in advance in the second learning device storage unit 22.

Export Process of Learning Model Migration Information

Next, a configuration in which the first learning device 10 exports the learning model migration information 30 will be described with reference to FIG. 6.

Figure 6:
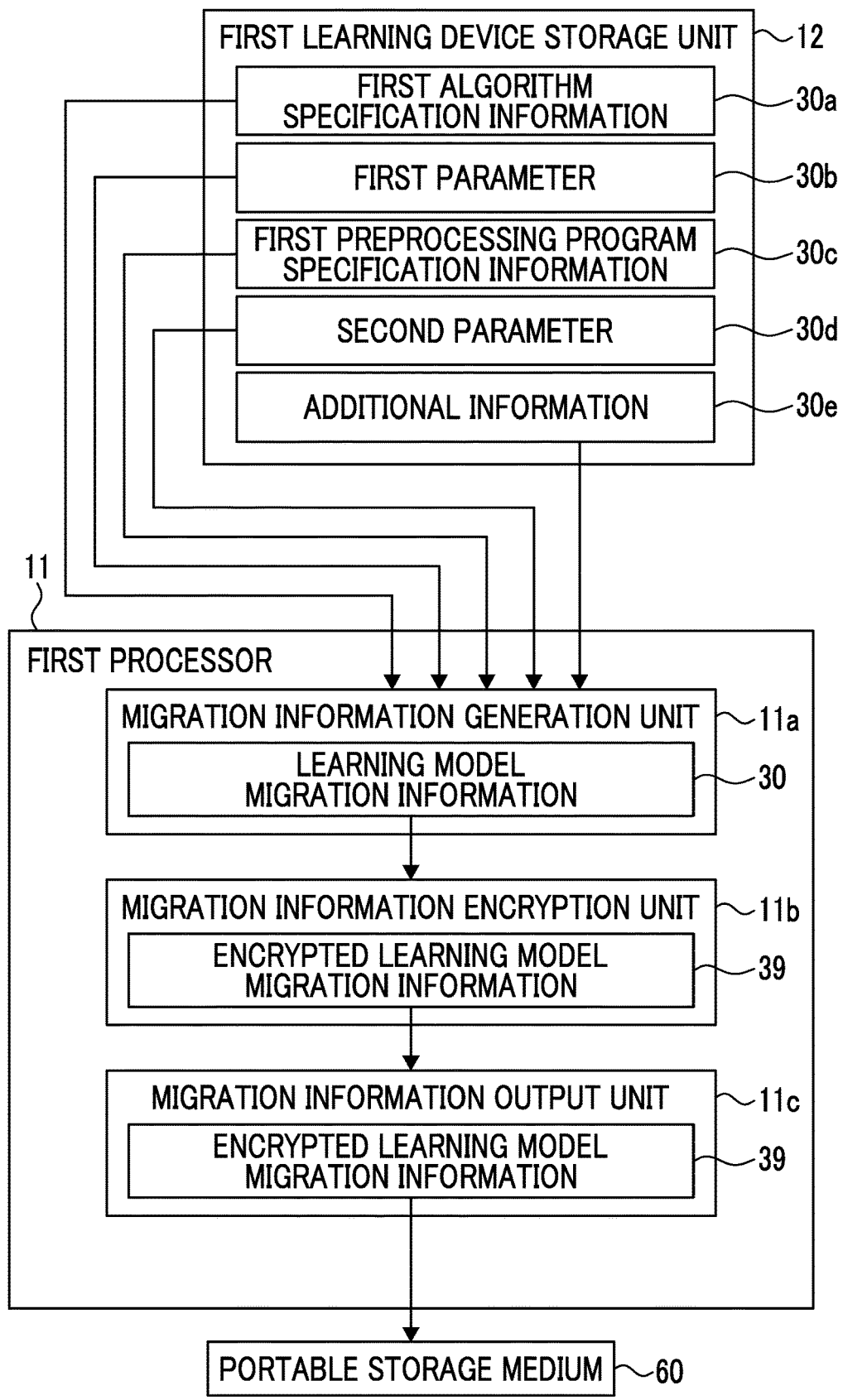
FIG. 6 is a functional block diagram for describing an export function of the learning model migration information by the first learning device.

As illustrated in FIG. 6, the first processor 11 includes a migration information generation unit 11a, a migration information encryption unit 11b, and a migration information output unit 11c as functional blocks. In other words, the first processor 11 functions as the migration information generation unit 11a, the migration information encryption unit 11b, and the migration information output unit 11c by executing the program stored in the first learning device storage unit 12.

The migration information generation unit 11a generates the learning model migration information 30 based on various information stored in the first learning device storage unit 12. Specifically, the migration information generation unit 11a acquires the first algorithm specification information 30a, the first parameter 30b, the first preprocessing program specification information 30c, the second parameter 30d, and the additional information 30e from the first learning device storage unit 12. Further, the migration information generation unit 11a generates the learning model migration information 30 by associating the acquired first algorithm specification information 30a, the first parameter 30b, the first preprocessing program specification information 30c, the second parameter 30d, and the additional information 30e.

The migration information encryption unit 11b is configured to encrypt the learning model migration information 30 stored in the first learning device storage unit 12. Specifically, the migration information encryption unit 11b acquires the learning model migration information 30 that is generated by the migration information generation unit 11a and acquires an encrypted file in a unique format that includes the encrypted learning model migration information 39 by encrypting the learning model migration information 30. Further, the migration information encryption unit 11b outputs the encrypted learning model migration information 39 to the migration information output unit 11c.

The migration information output unit 11c is configured to output the learning model migration information 30 (see FIG. 1) stored in the first learning device storage unit 12. Specifically, the migration information output unit 11c is configured to output the encrypted learning model migration information 39 that is encrypted by the migration information encryption unit 11b. In the present embodiment, the migration information output unit 11c acquires the encrypted learning model migration information 39 from the migration information encryption unit 11b. Further, the migration information output unit 11c outputs the acquired encrypted learning model migration information 39 to a portable storage medium 60. The portable storage medium 60 includes, for example, a universal serial bus (USB) memory.

The user migrates the learning model migration information 30 from the first learning device 10 to the second learning device 20 by storing the encrypted learning model migration information 39 for the second learning device 20 in the second learning device storage unit 22, by using the portable storage medium 60 where the encrypted learning model migration information 39 is stored.

Import Process of Learning Model Migration Information

Next, a configuration in which the second learning device 20 imports the learning model migration information 30 will be described with reference to FIG. 7.

Figure 7:
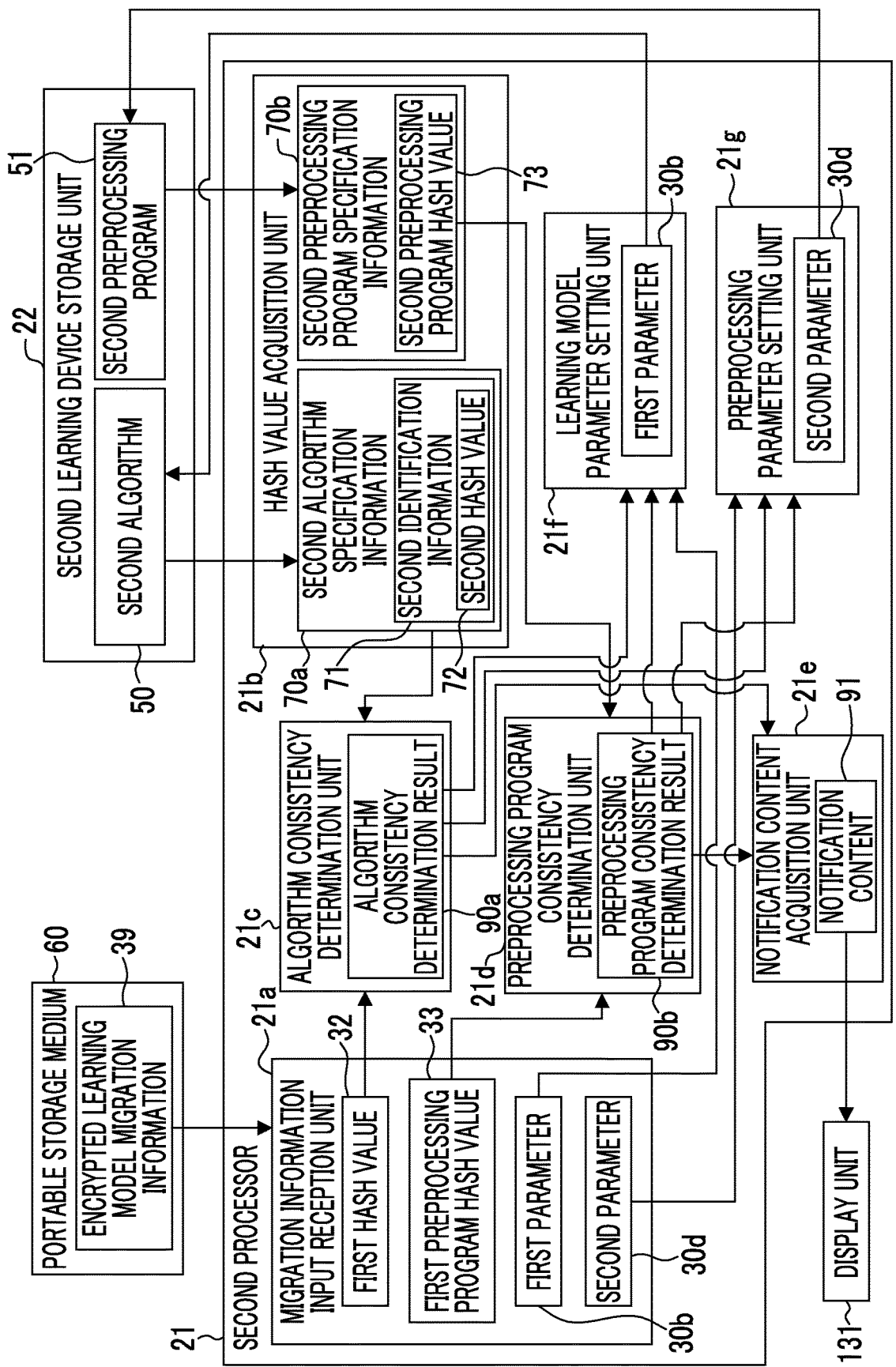
FIG. 7 is a functional block diagram for describing an import function of the learning model migration information by the second learning device.

As illustrated in FIG. 7, the second processor 21 includes a migration information input reception unit 21a, a hash value acquisition unit 21b, an algorithm consistency determination unit 21c, a preprocessing program consistency determination unit 21d, a notification content acquisition unit 21e, a learning model parameter setting unit 21f, and a preprocessing parameter setting unit 21g as functional blocks. In other words, the second processor 21 functions as the migration information input reception unit 21a, the hash value acquisition unit 21b, the algorithm consistency determination unit 21c, the preprocessing program consistency determination unit 21d, the notification content acquisition unit 21e, the learning model parameter setting unit 21f, and the preprocessing parameter setting unit 21g by executing the program stored in the second learning device storage unit 22.

The migration information input reception unit 21a receives an input of the learning model migration information 30 (see FIG. 1) including the first algorithm specification information 30a and the first parameter 30b. In the present embodiment, the migration information input reception unit 21a receives an input of the encrypted learning model migration information 39 from the portable storage medium 60. Further, the migration information input reception unit 21a is configured to decrypt the encrypted learning model migration information 39 that is encrypted by the migration information encryption unit 11b. That is, the migration information input reception unit 21a acquires the learning model migration information 30 by decrypting the encrypted learning model migration information 39 input from the portable storage medium 60. The migration information input reception unit 21a is configured to be capable of decrypting a file that is encrypted in a unique format by the migration information encryption unit 11b by executing a decryption program stored in the second learning device storage unit 22.

The migration information input reception unit 21a outputs the first hash value 32 of the learning model migration information 30 to the algorithm consistency determination unit 21c. Further, the migration information input reception unit 21a outputs the first preprocessing program hash value 33 of the learning model migration information 30 to the preprocessing program consistency determination unit 21d.

The hash value acquisition unit 21b is configured to acquire the second algorithm specification information 70a for specifying the second algorithm 50. The second algorithm specification information 70a includes second identification information 71 corresponding to the second algorithm 50. In the present embodiment, the second identification information 71 includes a second hash value 72 generated based on the second algorithm 50.

Further, the hash value acquisition unit 21b is configured to acquire the second preprocessing program specification information 70b for specifying the second preprocessing program 51. In the present embodiment, the second preprocessing program specification information 70b includes a second preprocessing program hash value 73.

The hash value acquisition unit 21b acquires the second algorithm 50 and the second preprocessing program 51 from the second learning device storage unit 22. The hash value acquisition unit 21b acquires the second hash value 72 from the second algorithm 50 by using, for example, a hash function. Further, the hash value acquisition unit 21b acquires the second preprocessing program hash value 73 from the second preprocessing program 51 by using, for example, a hash function. The hash value acquisition unit 21b acquires the second hash value 72 and the second preprocessing program hash value 73 based on data that cannot be changed by the user, not the data that can be changed by the user. That is, the hash value acquisition unit 21b acquires the second hash value 72 based on a source code or the like of the second algorithm 50, not a file name or the like of the second algorithm 50. The second hash value 72 becomes a different value from the previous second hash value 72 when the source code or the like of the second algorithm 50 becomes different even by one character. Further, the hash value acquisition unit 21b acquires the second preprocessing program hash value 73 based on a source code or the like of the second preprocessing program 51, not a file name of the second preprocessing program 51. The second preprocessing program hash value 73 becomes a different value from the previous second preprocessing program hash value 73 when the source code or the like of the second preprocessing program 51 becomes different even by one character.

The hash value acquisition unit 21b outputs the acquired second hash value 72 to the algorithm consistency determination unit 21c. Further, the hash value acquisition unit 21b outputs the acquired second preprocessing program hash value 73 to the preprocessing program consistency determination unit 21d.

The algorithm consistency determination unit 21c is configured to determine, based on the second algorithm specification information 70a for specifying the second algorithm 50 stored in the second learning device storage unit 22 and the first algorithm specification information 30a, whether or not consistency is established for estimation results, which are obtained when the first parameter 30b is used in the first algorithm 40 and the second algorithm 50.

In the present embodiment, the algorithm consistency determination unit 21c is configured to determine the consistency between the first algorithm 40 and the second algorithm 50 by determining whether or not the first identification information 31 (see FIG. 3) and the second identification information 71 match. Specifically, the algorithm consistency determination unit 21c is configured to determine whether or not the first hash value 32 and the second hash value 72 match.

Further, the algorithm consistency determination unit 21c outputs an algorithm consistency determination result 90a to the notification content acquisition unit 21e. When the consistency is established between the first algorithm 40 (see FIG. 2) and the second algorithm 50, the algorithm consistency determination unit 21c outputs "1" to the notification content acquisition unit 21e, the learning model parameter setting unit 21f, and the preprocessing parameter setting unit 21g as the algorithm consistency determination result 90a, for example. Further, when the consistency is not established between the first algorithm 40 and the second algorithm 50, the algorithm consistency determination unit 21c outputs "0 (zero)" to the notification content acquisition unit 21e, the learning model parameter setting unit 21f, and the preprocessing parameter setting unit 21g as the algorithm consistency determination result 90a, for example.

The preprocessing program consistency determination unit 21d is configured to determine, based on the first preprocessing program specification information 30c (see FIG. 3) and the second preprocessing program 51 stored in the second learning device storage unit 22, whether or not consistency is established for the results of performing the preprocessing with respect to the cell image 90 in the first preprocessing program 41 (see FIG. 2) and the second preprocessing program 51. Specifically, the preprocessing program consistency determination unit 21d determines whether or not the consistency is established between the first preprocessing program 41 and the second preprocessing program 51 by determining whether or not the first preprocessing program hash value 33 and the second preprocessing program hash value 73 match.

Further, the preprocessing program consistency determination unit 21d outputs the preprocessing program consistency determination result 90b to the notification content acquisition unit 21e. When the consistency is established between the first preprocessing program 41 (see FIG. 2) and the second preprocessing program 51, the preprocessing program consistency determination unit 21d outputs "1" to the notification content acquisition unit 21e, the learning model parameter setting unit 21f, and the preprocessing parameter setting unit 21g as the preprocessing program consistency determination result 90b, for example. Further, when the consistency is not established between the first preprocessing program 41 and the second preprocessing program 51, the preprocessing program consistency determination unit 21d outputs "0 (zero)" to the notification content acquisition unit 21e, the learning model parameter setting unit 21f, and the preprocessing parameter setting unit 21g as the preprocessing program consistency determination result 90b, for example.

The learning model parameter setting unit 21f is configured to set the first parameter 30b to be used together with the second algorithm 50 when the consistency is established between the first algorithm 40 (see FIG. 2) and the second algorithm 50 (see FIG. 5). Specifically, when "1" is input as the algorithm consistency determination result 90a from the algorithm consistency determination unit 21c, the learning model parameter setting unit 21f outputs the first parameter 30b to the second learning device storage unit 22. More specifically, the learning model parameter setting unit 21f stores the first parameter 30b in association with the second algorithm 50 stored in the second learning device storage unit 22.

Note that, even when the consistency is established between the first algorithm 40 and the second algorithm 50, the learning model parameter setting unit 21f does not set the first parameter 30b when the consistency is not established between the first preprocessing program 41 (see FIG. 2) and the second preprocessing program 51 (see FIG. 5). That is, the learning model parameter setting unit 21f sets the first parameter 30b when the consistency is established between the first algorithm 40 and the second algorithm 50 and also the consistency is established between the first preprocessing program 41 and the second preprocessing program 51.

The preprocessing parameter setting unit 21g is configured to set the second parameter 30d for the second preprocessing program 51 when the consistency is established for the results of performing the preprocessing on the first preprocessing program 41 (see FIG. 2) and the second preprocessing program 51 (see FIG. 5). Specifically, when "1" is input as the preprocessing program consistency determination result 90b from the preprocessing program consistency determination unit 21d, the preprocessing parameter setting unit 21g outputs the second parameter 30d to the second learning device storage unit 22. More specifically, the preprocessing parameter setting unit 21g stores the second parameter 30d in association with the second preprocessing program 51 stored in the second learning device storage unit 22.

Note that, even when the consistency is established between the first preprocessing program 41 and the second preprocessing program 51, the preprocessing parameter setting unit 21g does not set the second parameter 30d when the consistency is not established between the first algorithm 40 (see FIG. 2) and the second algorithm 50 (see FIG. 5). That is, the preprocessing parameter setting unit 21g sets the second parameter 30d when the consistency is established between the first preprocessing program 41 and the second preprocessing program 51 and also the consistency is established between the first algorithm 40 and the second algorithm 50.

The notification content acquisition unit 21e is configured to acquire the notification content 91. Specifically, the notification content acquisition unit 21e acquires the notification content 91 based on the algorithm consistency determination result 90a which is input from the algorithm consistency determination unit 21c and the preprocessing program consistency determination result 90b which is input from the preprocessing program consistency determination unit 21d. In the present embodiment, the notification content acquisition unit 21e acquires the notification content 91 based on the algorithm consistency determination result 90a and the preprocessing program consistency determination result 90b and based on whether or not the settings of the first parameter 30b and the second parameter 30d are successful.

The notification content 91 includes a message 91a (see FIG. 11) indicating that the import of the learning model was successful and a message 91b (see FIG. 12) indicating that the import of the learning model has failed. When the consistency is established for both the results of the algorithm consistency determination result 90a and the preprocessing program consistency determination result 90b, and when the settings of the first parameter 30b and the second parameter 30d were successful, the notification content acquisition unit 21e acquires the message 91a, which indicates that the import of the learning model was successful, as the notification content 91. That is, when both the algorithm consistency determination result 90a and the preprocessing program consistency determination result 90b are "1", and when the settings of the first parameter 30b and the second parameter 30d were successful, the notification content acquisition unit 21e acquires the message 91a, which indicates that the import of the learning model was successful, as the notification content 91.

Further, when the consistency is not established for either the algorithm consistency determination result 90a or the preprocessing program consistency determination result 90b, and when the setting of either the first parameter 30b or the second parameter 30d has failed, the notification content acquisition unit 21e acquires the message 91b, which indicates that the import of the learning model has failed, as the notification content 91. That is, when at least one of the algorithm consistency determination result 90a and the preprocessing program consistency determination result 90b is "0 (zero)", and when the setting of either the first parameter 30b or the second parameter 30d has failed, the notification content acquisition unit 21e acquires the message 91b, which indicates that the import of the learning model has failed, as the notification content 91. Further, the notification content acquisition unit 21e outputs the acquired notification content 91 to the display unit 131.

The display unit 131 displays the notification content 91 acquired from the notification content acquisition unit 21e.

Algorithm Compatibility

Next, a configuration will be described with reference to FIG. 8, in which the algorithm consistency determination unit 21c determines whether or not the consistency is established between the first algorithm 40 and the second algorithm 50 when at least one of the version of the first algorithm 40 and the version of the second algorithm 50 is upgraded.

Figure 8:
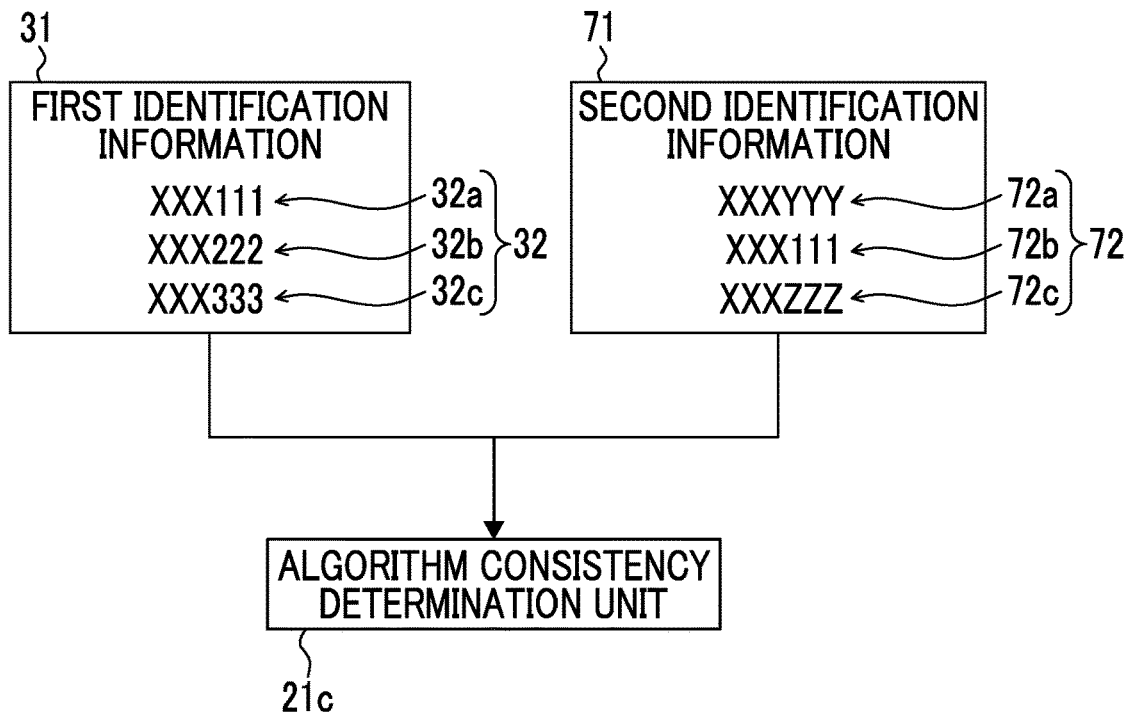
FIG. 8 is a block diagram for describing a determination process of an algorithm consistency determination unit in a case where versions of a first algorithm and a second algorithm are different from each other.

As illustrated in FIG. 8, regarding the first algorithm specification information 30a, when the version of the first algorithm 40 is upgraded, the first algorithm specification information 30a after upgrading the version includes a compatible version of the first algorithm specification information 30a. In the example illustrated in FIG. 8, as the first algorithm specification information 30a, three hash values of a first hash value 32a, a first hash value 32b, and a first hash value 32c are included.

Further, as illustrated in FIG. 8, regarding the second algorithm specification information 70a, when the version of the second algorithm 50 is upgraded, the second algorithm specification information 70a after upgrading the version includes a compatible version of the second algorithm specification information 70a. In the example illustrated in FIG. 8, as the second algorithm specification information 70a, three hash values of a second hash value 72a, a second hash value 72b, and a second hash value 72c are included.

In the present embodiment, even when the versions of the first algorithm 40 and the second algorithm 50 are different from each other, the algorithm consistency determination unit 21c is configured to determine that the first algorithm 40 and the second algorithm 50 have consistency when the first algorithm 40 and the second algorithm 50 are compatible with each other.

As illustrated in FIG. 8, even when the first hash value 32a and the second hash value 72a are different from each other, the algorithm consistency determination unit 21c determines that the first algorithm 40 and the second algorithm 50 have consistency when the first hash value 32a and the second hash value 72b are equal to each other. That is, when at least one of the number of the first hash values 32 and the number of the second hash values 72 is plural, the algorithm consistency determination unit 21c determines the consistency between the first algorithm 40 and the second algorithm 50 depending on whether or not any of a plurality of first hash values 32 matches the second hash value 72, or depending on whether or not any of a plurality of second hash values 72 matches the first hash value 32.

Learning Model Migration Information Export Screen

Next, an example of a screen when the learning model migration information 30 is exported will be described with reference to FIG. 9.

Figure 9:
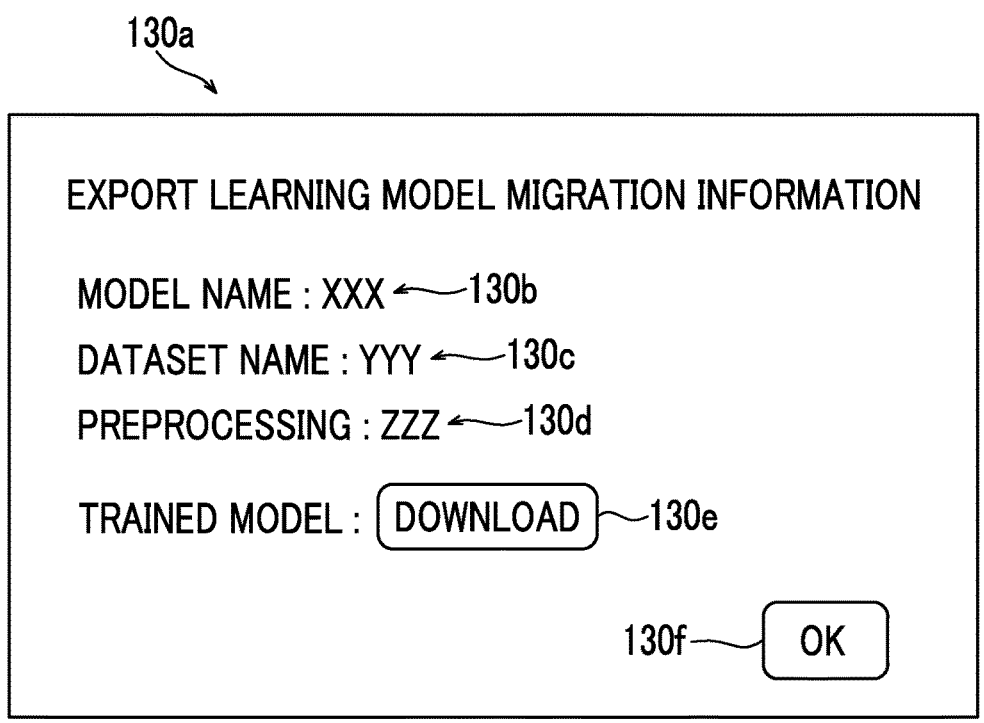
FIG. 9 is a diagram illustrating an example of a screen when the learning model migration information is exported.

FIG. 9 illustrates an example of a learning model migration information export screen 130a displayed on the display unit 130 (see FIG. 1). A learning model name 130b, a name of dataset 130c, and preprocessing information 130d are displayed on the learning model migration information export screen 130a. Further, a download button 130e and an OK button 130f are displayed on the learning model migration information export screen 130a. The download button 130e and the OK button 130f are push buttons on the GUI.

When the download button 130e is pressed, the first processor 11 executes the export process of the learning model migration information 30 (see FIG. 1) illustrated in FIG. 6.

Further, when the OK button 130f is pressed, the first processor 11 closes the learning model migration information export screen 130a.

Next, an example of a screen when the learning model migration information 30 is imported will be described with reference to FIGS. 10 to 12.

Figure 10:
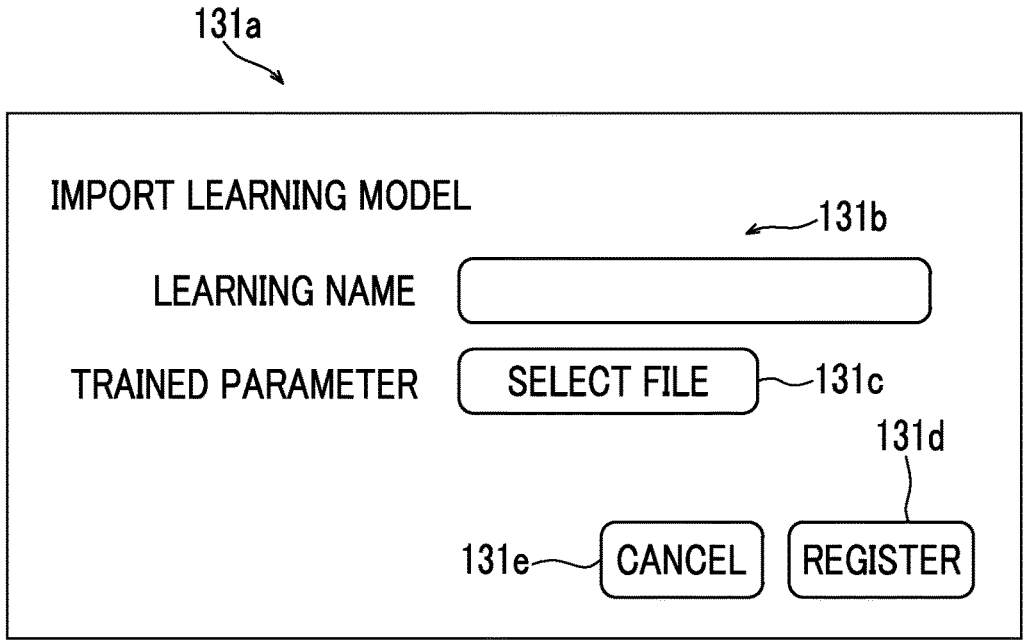
FIG. 10 is a diagram illustrating an example of a screen when the learning model migration information is imported.

FIG. 10 illustrates a learning model import screen 131a displayed on the display unit 131 (see FIG. 1). A learning name input field 131b is displayed on the learning model import screen 131a. Further, a file selection button 131c, a registration button 131d, and a cancel button 131e are displayed on the learning model import screen 131a. The file selection button 131c, the registration button 131d, and the cancel button 131e are push buttons on the GUI. Note that, the learning name is a name stored as a learning process when the cell image 90 is analyzed in the second learning device 20.

When the file selection button 131c is pressed, the second processor 21 displays a selection screen (not shown) of the encrypted file of the encrypted learning model migration information 39 when the import process of the learning model migration information 30 illustrated in FIGS. 8 and 9 and the process of setting the first parameter 30b and the second parameter 30d are executed.

When the registration button 131d is pressed, the second processor 21 executes the import process of the learning model migration information 30 illustrated in FIG. 8 and the process of setting the first parameter 30b and the second parameter 30d.

Figure 11:
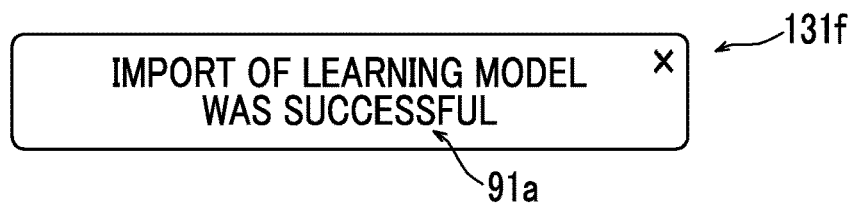
FIG. 11 is a diagram illustrating an example of a screen when import of the learning model migration information is successful.

FIG. 11 illustrates an example of an import success screen 131f displayed on the display unit 131 (see FIG. 1) when the import of the learning model migration information 30 was successful. The message 91a, which indicates that the import of the learning model was successful, is displayed on the import success screen 131f. The import success screen 131f is displayed as a pop-up screen on the learning model import screen 131a.

Figure 12:
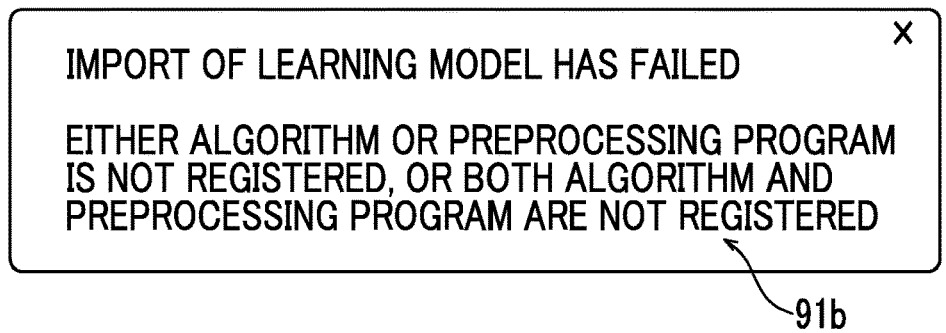
FIG. 12 is a diagram illustrating an example of a screen when the import of the learning model migration information has failed.

FIG. 12 illustrates an example of an import failure screen 131g displayed on the display unit 131 (see FIG. 1) when the import of the learning model migration information 30 has failed. The message 91b, which indicates that the import of the learning model has failed, is displayed on the import failure screen 131*g*. The import failure screen 131*g* is displayed as a pop-up screen on the learning model import screen 131*a*.

Figure 13:
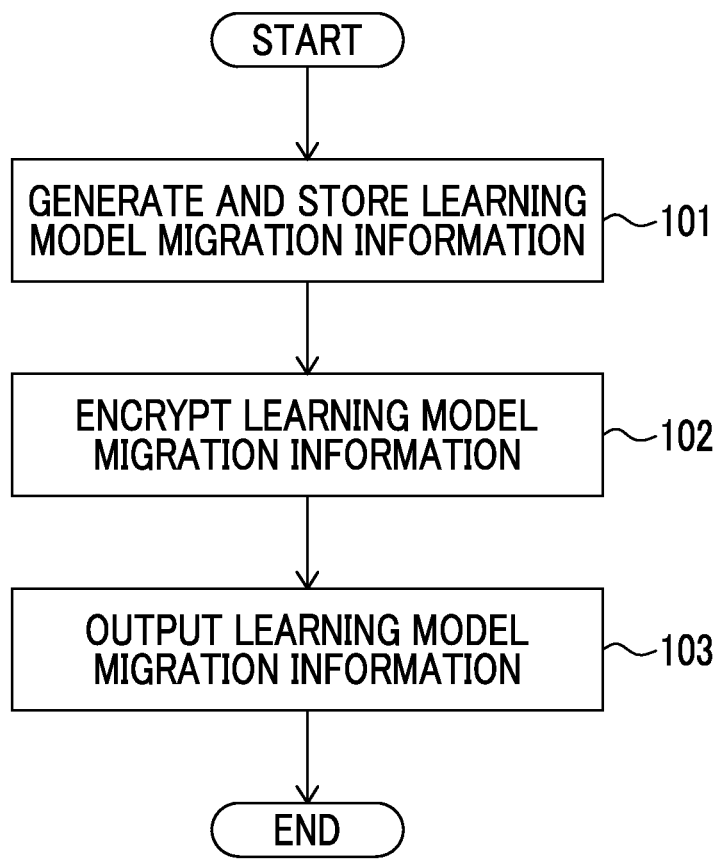
FIG. 13 is a flowchart for describing an export process of the learning model migration information by the first learning device.

Next, a process of exporting the learning model migration information 30 (see FIG. 1) by the first learning device 10 (see FIG. 1) will be described with reference to FIG. 13. The export process of the learning model migration information 30 by the first learning device 10 is performed before the second learning device 20 (the second processor 21) receives the input of the learning model migration information 30.

In step 101, the first learning device 10 (the first processor 11) generates the learning model migration information 30. Further, the first processor 11 stores the generated learning model migration information 30 in the first learning device storage unit 12.

In step 102, the migration information encryption unit 11*b* encrypts the learning model migration information 30. In the present embodiment, the migration information encryption unit 11*b* acquires the encrypted learning model migration information 39 by encrypting the learning model migration information 30 stored in the first learning device storage unit 12.

In step 103, the first learning device 10 (the migration information output unit 11*c*) outputs the learning model migration information 30 stored in the first learning device storage unit 12. Specifically, the migration information output unit 11*c* outputs the encrypted learning model migration information 39 that is encrypted by the migration information encryption unit 11*b*. Thereafter, the process ends.

Figure 14:
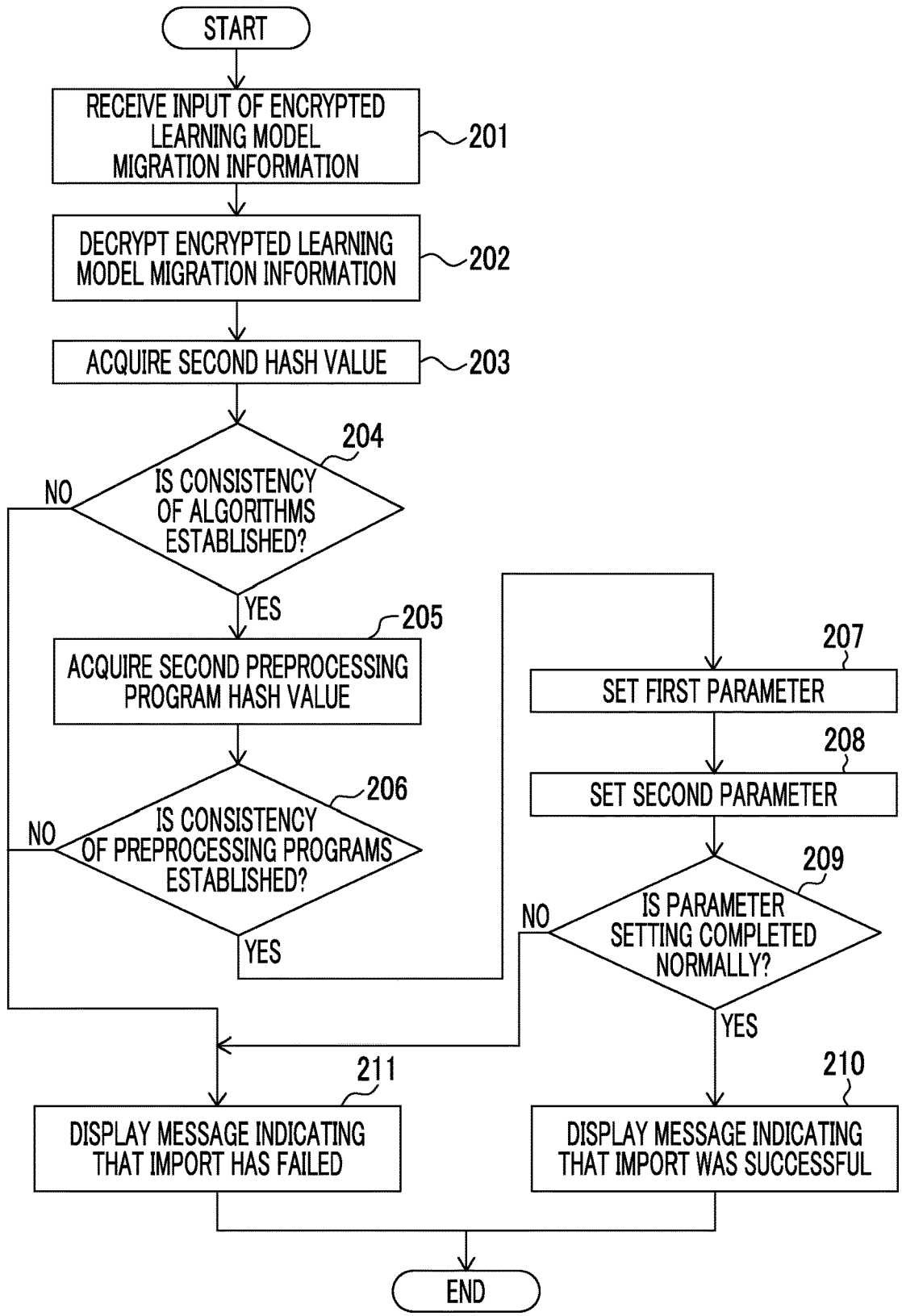
FIG. 14 is a flowchart for describing an import process of the learning model migration information by the second learning device.

Next, a process of importing the learning model migration information 30 (see FIG. 1) by the second learning device 20 (see FIG. 1) will be described with reference to FIG. 14. The process of importing the learning model migration information 30 by the second learning device 20 is performed after the learning model migration information 30 is exported by the first learning device 10. Further, the process of importing the learning model migration information 30 by the second learning device 20 is started when the user selects the encrypted file on the learning model import screen 131*a* (see FIG. 10) and the registration button 131*d* is pressed.

In step 201, the migration information input reception unit 21*a* (see FIG. 7) receives the input of the learning model migration information 30 including the first algorithm specification information 30*a* (see FIG. 3) for specifying the first algorithm 40 (see FIG. 2) of the learning model used for the analysis of the cell image 90 (see FIG. 1), and the first parameter 30*b* (see FIG. 3), which is output when the learning model is generated and is a learning parameter when the cell image 90 is analyzed by the learning model. In the present embodiment, the migration information input reception unit 21*a* receives the input of the encrypted learning model migration information 39 (see FIG. 6).

In step 202, the migration information input reception unit 21*a* (see FIG. 7) acquires the learning model migration information 30 (see FIG. 1) by decrypting the encrypted learning model migration information 39.

In step 203, the hash value acquisition unit 21*b* (see FIG. 7) acquires the second hash value 72 (see FIG. 7).

In step 204, the algorithm consistency determination unit 21*c* (see FIG. 7) determines, based on the second algorithm 50 (see FIG. 5) stored in the second learning device storage unit 22 (see FIG. 5) and the first algorithm specification information 30*a* (see FIG. 3) included in the learning model migration information 30, whether or not the consistency is established for estimation results, which are obtained when the first parameter 30*b* is used in the first algorithm 40 and the second algorithm 50. In the present embodiment, the second processor 21 determines whether or not the consistency is established between the first algorithm 40 and the second algorithm 50 by determining whether or not the first hash value 32 (see FIG. 3) and the second hash value 72 (see FIG. 7) match. When the consistency is established between the first algorithm 40 and the second algorithm 50, the process proceeds to step 205. When the consistency is not established between the first algorithm 40 and the second algorithm 50, the process proceeds to step 210.

In step 205, the hash value acquisition unit 21*b* (see FIG. 7) acquires the second preprocessing program hash value 73 (see FIG. 7).

In step 206, the preprocessing program consistency determination unit 21*d* (see FIG. 7) determines whether or not the consistency is established between the first preprocessing program 41 (see FIG. 2) and the second preprocessing program 51 (see FIG. 5). In the present embodiment, the preprocessing program consistency determination unit 21*d* determines whether or not the first preprocessing program 41 and the second preprocessing program 51 match by determining whether or not the first preprocessing program hash value 33 (see FIG. 3) and the second preprocessing program hash value 73 match (see FIG. 7). When the first preprocessing program 41 and the second preprocessing program 51 match, the process proceeds to step 207. When the first preprocessing program 41 and the second preprocessing program 51 do not match, the process proceeds to step 211.

In step 207, the learning model parameter setting unit 21*f* (see FIG. 8) sets the first parameter 30*b* (see FIG. 3) to be used together with the second algorithm 50 when the consistency is established between the first algorithm 40 (see FIG. 2) and the second algorithm 50 (see FIG. 5). In the present embodiment, the learning model parameter setting unit 21*f* sets the first parameter 30*b* by storing the second algorithm 50 and the first parameter 30*b* in association with each other in the second learning device storage unit 22 (see FIG. 5).

In step 208, the preprocessing parameter setting unit 21*g* (see FIG. 8) sets the second parameter 30*d* in the second learning device 20. In the present embodiment, the preprocessing parameter setting unit 21*g* sets the second parameter 30*d* by storing the second preprocessing program 51 and the second parameter 30*d* in association with each other in the second learning device storage unit 22 (see FIG. 5).

In step 209, whether or not the parameter setting is completed normally is determined. When the parameter setting is completed normally, the process proceeds to step 210. When the parameter setting is not completed normally, the process proceeds to step 211.

In step 210, the display unit 131 (see FIG. 1) displays the message 91*a* (see FIG. 11) indicating that the import was successful. Thereafter, the process ends.

When the process proceeds from step 204 or step 206 to step 211, in step 211, the display unit 131 displays the message 91*b* (see FIG. 12) indicating that the import has failed. Thereafter, the process ends.

As illustrated in steps 210 and 211, the display unit 131 (see FIG. 1) notifies the user of whether or not the consistency is established between the first algorithm 40 (see FIG. 2) and the second algorithm 50 (see FIG. 5). That is, when the consistency is established between the first algorithm 40 and the second algorithm 50, the display unit 131 displays the message 91*a* indicating that the import was successful.

Further, when the consistency is not established between the first algorithm 40 and the second algorithm 50, the display unit 131 displays the message 91b indicating that the import has failed.

Effects of Present Embodiment

In the present embodiment, the following effects can be obtained.

In the present embodiment, as described above, a migration system 200 of a learning model for cell image analysis is a migration system of a learning model for cell image analysis that migrates a learning model used for analyzing a cell image 90 from a first learning device 10 to a second learning device 20, in which the second learning device 20 includes a migration information input reception unit 21a that receives an input of learning model migration information 30 including first algorithm specification information 30a for specifying a first algorithm 40 of the learning model used for analyzing the cell image 90 and a first parameter 30b, which is output when the learning model is generated and is a learning parameter when the cell image 90 is analyzed by using the learning model, a second learning device storage unit 22 that stores a second algorithm 50 of the learning model used for analyzing the cell image 90, an algorithm consistency determination unit 21c that determines, based on second algorithm specification information 70a for specifying the second algorithm 50 stored in the second learning device storage unit 22 and the first algorithm specification information 30a, whether or not consistency is established for estimation results, which are obtained when the first parameter 30b is used in the first algorithm 40 and the second algorithm 50, a display unit 131 that makes a notification of whether or not the consistency is established between the first algorithm 40 and the second algorithm 50, and a learning model parameter setting unit 21f that sets, when the consistency is established between the first algorithm 40 and the second algorithm 50, the first parameter 30b to be used together with the second algorithm 50.

As a result, since the algorithm consistency determination unit 21c and the learning model parameter setting unit 21f are provided, it is determined whether or not consistency is established for the estimation results, which are obtained when the first parameter 30b, which is used for analyzing the cell image 90, is used in the first algorithm 40 of the first learning device 10 and the second algorithm 50 of the second learning device 20. Further, when the consistency is established between the first algorithm 40 and the second algorithm 50, the first parameter 30b is set in the second learning device 20. Therefore, the first parameter 30b can be set in the second learning device 20 without performing the same learning as in the first learning device 10 in the second learning device 20. As a result, the learning model can be easily migrated. Further, since the algorithm consistency determination unit 21c and the display unit 131 are provided, when the consistency is not established between the first algorithm 40 and the second algorithm 50, the notification is made that the consistency is not established between the first algorithm 40 and the second algorithm 50. Therefore, the user can grasp that the consistency is not established between the first algorithm 40 of the first learning device 10, which is a migration source, and the second algorithm 50 of the second learning device 20, which is a migration destination, and can grasp the reason why the learning model cannot be migrated. As a result, the user convenience can be improved.

Further, in the present embodiment, as described above, a migration method of a learning model for cell image analysis is a migration method of a learning model for cell image analysis of migrating a learning model used for analyzing a cell image 90 from a first computer (a first learning device 10) to a second computer (a second learning device 20), the migration method includes: receiving an input of learning model migration information 30 including first algorithm specification information 30a for specifying a first algorithm 40 of the learning model used for analyzing the cell image 90 and a first parameter 30b, which is output when the learning model is generated and is a learning parameter when the cell image 90 is analyzed by using the learning model, by the second computer (the second learning device 20); determining, based on a second algorithm 50 stored in a second learning device storage unit 22 and the first algorithm specification information 30a included in the learning model migration information 30, whether or not consistency is established for estimation results, which are obtained when the first parameter 30b is used in the first algorithm 40 and the second algorithm 50, by the second computer (the second learning device 20); making a notification of whether or not the consistency is established between the first algorithm 40 and the second algorithm 50, by the second computer (the second learning device 20); and setting, when the consistency is established between the first algorithm 40 and the second algorithm 50, the first parameter 30b to be used together with the second algorithm 50, by the second computer (the second learning device 20).

As a result, similarly to the migration system 200 of a learning model for cell image analysis, it is possible to provide a migration method of a learning model for cell image analysis capable of easily migrating the learning model.

Further, in the above embodiment, the following further effects can be obtained by configuring the method as follows.

That is, in the present embodiment, as described above, the first learning device 10 includes the first learning device storage unit 12 that stores the learning model migration information 30 and the migration information output unit 11c that outputs the learning model migration information 30 stored in the first learning device storage unit 12. As a result, for example, by outputting the learning model migration information 30 to a portable storage medium 60 or the like, the learning model migration information 30 can be easily migrated from the first learning device 10 to the second learning device 20.

Further, in the present embodiment, as described above, the learning model migration information 30 further includes preprocessing program specification information (first preprocessing program specification information 30c) for specifying a first preprocessing program 41, which is a preprocessing program for the cell image 90 when the learning model is trained, the second learning device storage unit 22 is configured to further store a second preprocessing program 51, which is a preprocessing program for the cell image 90, and the second learning device 20 further includes a preprocessing program consistency determination unit 21d that determines, based on the first preprocessing program specification information 30c and the second preprocessing program 51 stored in the second learning device storage unit 22, whether or not consistency is established for results of performing preprocessing with respect to the cell image 90 between the first preprocessing program 41 and the second preprocessing program 51. As a result, the user can easily grasp whether or not the consistency is established between the first preprocessing program 41 executed in the first learning device 10 and the second preprocessing program 51 in the second learning device 20. As a result, when the learning model is migrated from the first learning device 10 to the second learning device 20, the user can easily grasp whether or not the second parameter 30d for executing the preprocessing program can be migrated.

Further, in the present embodiment, as described above, the learning model migration information 30 further includes a second parameter 30d corresponding to the first preprocessing program 41, and a preprocessing parameter setting unit 21g that sets the second parameter 30d with respect to the second preprocessing program 51 when the consistency is established for the results of performing the preprocessing on the first preprocessing program 41 and the second preprocessing program 51, is further provided. As a result, the second preprocessing program 51 can execute the same preprocessing as the preprocessing executed by the first preprocessing program 41 without setting the second parameter 30d by the user. As a result, the burden on the user can be reduced as compared with the configuration in which the second parameter 30d is set by the user. Further, even when it is difficult to duplicate the first preprocessing program 41 in the second learning device 20, by storing the second preprocessing program 51 similar to the first preprocessing program 41 in the second learning device 20 in advance and setting the second parameter 30d for the second learning device 20, it is possible to easily migrate the preprocessing program.

Further, in the present embodiment, as described above, the learning model migration information 30 further includes at least one of a name of dataset 34 used for training the learning model, the number of images 35 of the cell images 90 used for training the learning model, a ratio 36 of training data, verification data, and test data in the data used for training the learning model, a size 37 of the cell image 90 used for training the learning model, and an index value 38 at a time of training the learning model. As a result, the user can check the name of dataset 34, the number of images 35 of the cell images 90, the ratio 36 of the training data, the verification data, and the test data, the size 37 of the cell image 90, and the index value 38, in the second learning device 20. As a result, the user can grasp in the second learning device 20 how the first learning device 10 has trained so that the user convenience can be improved.

Further, in the present embodiment, described above, the first learning device 10 further includes a migration information encryption unit 11b that encrypts the learning model migration information 30 stored in the first learning device storage unit 12, the migration information output unit 11c is configured to output the encrypted learning model migration information 39 that is encrypted by the migration information encryption unit 11b, and the migration information input reception unit 21a is configured to decrypt the encrypted learning model migration information 39 that is encrypted by the migration information encryption unit 11b. As a result, the learning model migration information 30 can be migrated from the first learning device 10 to the second learning device 20 in an encrypted state. As a result, since it is possible to suppress the leakage of the learning model migration information 30, even when the learning model migration information 30 includes highly confidential information, migration can be possible from the first learning device 10 to the second learning device 20.

Further, in the present embodiment, as described above, regarding the first algorithm specification information 30a, when a version of the first algorithm 40 is upgraded, the first algorithm specification information 30a after upgrading the version includes a compatible version of the first algorithm specification information 30a, regarding the second algorithm specification information 70a, when a version of the second algorithm 50 is upgraded, the second algorithm specification information 70a after upgrading the version includes a compatible version of the second algorithm specification information 70a, and even when the versions of the first algorithm 40 and the second algorithm 50 are different from each other, the algorithm consistency determination unit 21c is configured to determine that the first algorithm 40 and the second algorithm 50 have the consistency when the first algorithm 40 and the second algorithm 50 are compatible with each other. As a result, even when the versions of the first algorithm 40 and the second algorithm 50 do not match, the learning model can be migrated from the first learning device 10 to the second learning device 20 when the versions of the first algorithm 40 and the second algorithm 50 are compatible with each other. As a result, the degree of freedom of the version of the first algorithm 40 and the second algorithm 50 can be improved.

Further, in the present embodiment, as described above, the first algorithm specification information 30a includes first identification information 31 corresponding to the first algorithm 40, the second algorithm specification information 70a includes second identification information 71 corresponding to the second algorithm 50, and the algorithm consistency determination unit 21c is configured to determine the consistency between the first algorithm 40 and the second algorithm 50 by determining whether or not the first identification information 31 and the second identification information 71 match. As a result, since the consistency between the first algorithm 40 and the second algorithm 50 is determined depending on whether or not the first identification information 31 and the second identification information 71 match, by acquiring the first identification information 31 and the second identification information 71, the consistency between the first algorithm 40 and the second algorithm 50 can be easily determined.

Further, in the present embodiment, as described above, the first identification information 31 includes a first hash value 32 generated based on the first algorithm 40, the second identification information 71 includes a second hash value 72 generated based on the second algorithm 50, and the algorithm consistency determination unit 21c is configured to determine whether or not the first hash value 32 and the second hash value 72 match. The hash value is a unique value acquired based on the content of the algorithm. Therefore, for example, even when the file name of the algorithm is changed, the hash value is not changed when the content of the algorithm is not changed. Therefore, by configuring as above, for example, even when it is different from the configuration for determining the consistency between the first algorithm 40 and the second algorithm 50 based on the file name of the first algorithm 40 and the file name of the second algorithm 50 and the file names are different from each other, it can be determined that the consistency is established between the first algorithm 40 and the second algorithm 50 when the first hash value 32 and the second hash value 72 match. As a result, the accuracy of determining the consistency between the first algorithm 40 and the second algorithm 50 can be improved.

Further, in the present embodiment, as described above, a step of storing the learning model migration information 30 before receiving the input of the learning model migration information 30 by the second computer (the second learning device 20), by the first computer (the first learning device 10), and a step of outputting the stored learning model migration information 30 before receiving the input of the learning model migration information 30 by the second computer (the second learning device 20), by the first computer (the first learning device 10) are provided. As a result, by outputting the learning model migration information 30 to the portable storage medium 60 or the like, the learning model migration information 30 can be easily migrated from the first computer (the first learning device 10) to the second computer (the second learning device 20).

Modification Example

Note that the embodiment disclosed this time should be considered to be exemplary and not restrictive in all respects. The scope of the present invention is indicated by the scope of claims rather than the description of the above-described embodiment, and further includes all modifications (modification examples) within the meaning and scope equivalent to the scope of claims.

Figure 15:
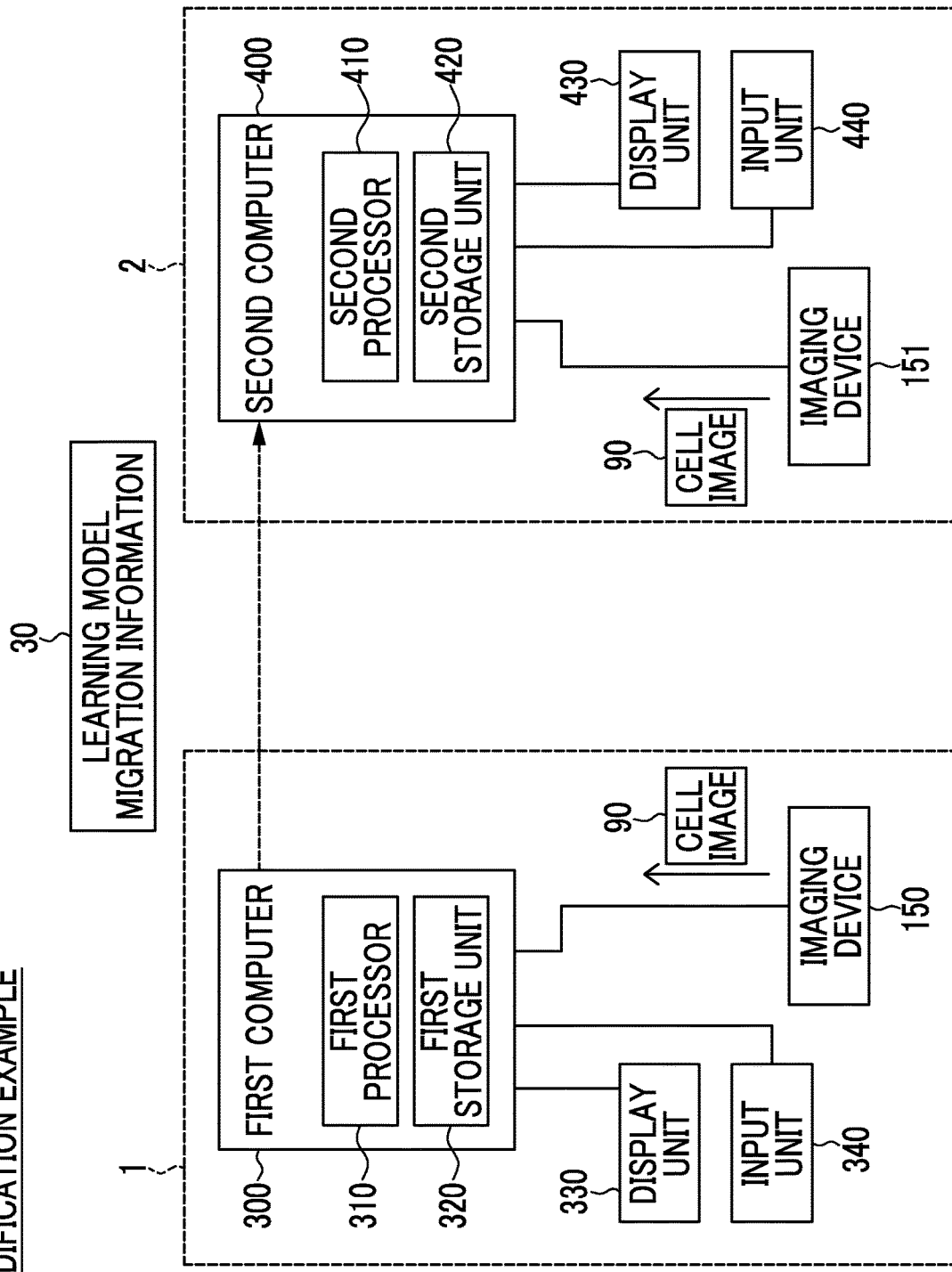
FIG. 15 is a block diagram illustrating a migration method of a learning model for cell image analysis according to a modification example.

For example, in the above embodiment, the first learning device 10 and the second learning device 20 are built by using a client-server model, but the present invention is not limited to this. In the present invention, for example, as illustrated in FIG. 15, the first learning device 10 and the second learning device 20 may be configured by using independent computers. In the example in FIG. 15, the first learning device 10 is composed of a first computer 300 including a first processor 310 and a first storage unit 320. A display unit 330 and an input unit 340 are connected to the first computer 300. The first computer 300 is communicably connected to an imaging device 150. The first processor 310 of the first computer 300 includes the migration information encryption unit 11b and the migration information output unit 11c illustrated in the above embodiment (see FIG. 6) as functional blocks.

Further, in the example in FIG. 15, the second learning device 20 is composed of a second computer 400 including a second processor 410 and a second storage unit 420. A display unit 430 and an input unit 440 are connected to the second computer 400. The second computer 400 is communicably connected to an imaging device 151. The second processor 410 of the second computer 400 includes the migration information input reception unit 21a, the hash value acquisition unit 21b, the algorithm consistency determination unit 21c, the preprocessing program consistency determination unit 21d, the notification content acquisition unit 21e, the learning model parameter setting unit 21f, and the preprocessing parameter setting unit 21g, which are illustrated in the above embodiment (see FIGS. 7 and 8), as functional blocks.

Further, in the above embodiment and the modification example illustrated in FIG. 15, an example has been shown in which each process, as the migration information generation unit 11a, the migration information encryption unit 11b, and the migration information output unit 11c, is executed by the single first processor 11 (310), but the present invention is not limited to this. Each process of exporting the learning model migration information 30 may be shared and executed by a plurality of processors. Each of the processes may be executed by a separate processor. The plurality of processors may be provided in different computers. That is, the first learning device 10 may be composed of a plurality of computers.

Further, in the above embodiment and the modification example illustrated in FIG. 15, an example has been shown in which each process, as the migration information input reception unit 21a, the hash value acquisition unit 21b, the algorithm consistency determination unit 21c, the preprocessing program consistency determination unit 21d, the notification content acquisition unit 21e, the learning model parameter setting unit 21f, and the preprocessing parameter setting unit 21g, is executed by the single second processor 21 (410), but the present invention is not limited to this. Each process of importing the learning model migration information 30 may be shared and executed by a plurality of processors. Each of the processes may be executed by a separate processor. The plurality of processors may be provided in different computers. That is, the second learning device 20 may be composed of a plurality of computers.

Further, in the above embodiment, an example of the configuration has been shown in which the first learning device 10 performs the export process of the learning model migration information 30, and the second learning device 20 performs the import process of the learning model migration information 30, but the present invention is not limited to this. For example, both the first learning device 10 and the second learning device 20 may be configured to perform the export process and the import process of the learning model migration information 30. That is, each of the first learning device 10 (the first processor 11) and the second learning device 20 (the second processor 21) may include the migration information generation unit 11a, the migration information encryption unit 11b, the migration information output unit 11c, the migration information input reception unit 21a, the hash value acquisition unit 21b, the algorithm consistency determination unit 21c, the preprocessing program consistency determination unit 21d, the notification content acquisition unit 21e, the learning model parameter setting unit 21f, and the preprocessing parameter setting unit 21g.

Further, in the above embodiment, an example of the configuration has been shown in which the algorithm consistency determination unit 21c determines the consistency between the first algorithm 40 and the second algorithm 50 depending on whether or not the first hash value 32 and the second hash value 72 match, but the present invention is not limited to this. For example, the algorithm consistency determination unit 21c may be configured to determine the consistency between the first algorithm 40 and the second algorithm 50 by using the file name of the first algorithm 40 and the file name of the second algorithm 50.

Further, in the above embodiment, an example of the configuration has been shown in which the second learning device 20 includes the preprocessing program consistency determination unit 21d, but the present invention is not limited to this. For example, the second learning device 20 may not need to include the preprocessing program consistency determination unit 21d. However, when the second learning device 20 does not include the preprocessing program consistency determination unit 21d, the user needs to check the consistency between the first preprocessing program 41 and the second preprocessing program 51, which increases the burden on the user. Therefore, the second learning device 20 preferably includes the preprocessing program consistency determination unit 21d.

Further, in the above embodiment, an example of the configuration has been shown in which the second learning device 20 includes the preprocessing parameter setting unit 21g, but the present invention is not limited to this. For example, the second learning device 20 may not need to include the preprocessing parameter setting unit 21g. However, when the second learning device 20 does not include the preprocessing parameter setting unit 21g, the user needs to set the second parameter 30d, which increases the burden on the user. Therefore, the second learning device 20 preferably includes the preprocessing parameter setting unit 21g.

Further, in the above embodiment, an example has been shown in which the learning model migration information 30 includes the additional information 30e, but the present invention is not limited to this. For example, the learning model migration information 30 may not need to include the additional information 30e.

Further, in the above embodiment, an example of the configuration has been shown in which the first learning device 10 includes the migration information encryption unit 11b, but the present invention is not limited to this. For example, the first learning device 10 may not need to include the migration information encryption unit 11b. However, when the first learning device 10 does not include the migration information encryption unit 11b, there is a possibility of the leakage of the learning model migration information 30. Therefore, the first learning device 10 preferably includes the migration information encryption unit 11b.

Further, in the above embodiment, an example of the configuration has been shown in which even when the versions of the first algorithm 40 and the second algorithm 50 are different from each other, the algorithm consistency determination unit 21c determines that the first algorithm 40 and the second algorithm 50 have consistency when the first algorithm 40 and the second algorithm 50 are compatible with each other, but the present invention is not limited to this. For example, the algorithm consistency determination unit 21c may be configured to determine that the consistency is not established between the first algorithm 40 and the second algorithm 50 when the versions of the first algorithm 40 and the second algorithm 50 are different from each other. However, when the versions of the first algorithm 40 and the second algorithm 50 are different from each other, and when the algorithm consistency determination unit 21c determines that the consistency is not established between the first algorithm 40 and the second algorithm 50, the migration becomes impossible between the first algorithm 40 and the second algorithm 50, which are compatible with each other even though the versions are different. Therefore, even when the versions of the first algorithm 40 and the second algorithm 50 are different from each other, the algorithm consistency determination unit 21c is preferably configured to determine that the first algorithm 40 and the second algorithm 50 have consistency when the first algorithm 40 and the second algorithm 50 are compatible with each other.

Further, in the above embodiment, an example of the configuration has been shown in which the learning model for analyzing the cell image 90 is migrated from the first learning device 10 to the second learning device 20 as the migration system 200 of a learning model for cell image analysis, but the present invention is not limited to this. For example, the present invention can also be applied to a case where a learning model, which is trained to analyze measurement data acquired by a liquid chromatograph or the like, is migrated from the first learning device 10 to the second learning device 20.

Aspect

It will be understood by those skilled in the art that the above-mentioned exemplary embodiments are specific examples of the following aspects.

Item 1

A migration system of a learning model for cell image analysis that migrates a learning model used for analyzing a cell image from a first learning device to a second learning device, in which the second learning device includes a migration information input reception unit that receives an input of learning model migration information including first algorithm specification information for specifying a first algorithm of the learning model used for analyzing the cell image and a first parameter, which is output when the learning model is generated and is a learning parameter when the cell image is analyzed by using the learning model, a second learning device storage unit that stores a second algorithm of the learning model used for analyzing the cell image, an algorithm consistency determination unit that determines, based on second algorithm specification information for specifying the second algorithm stored in the second learning device storage unit and the first algorithm specification information, whether or not consistency is established for estimation results, which are obtained when the first parameter is used, between the first algorithm and the second algorithm, a notification unit that makes a notification of whether or not the consistency is established between the first algorithm and the second algorithm, and a learning model parameter setting unit that sets, when the consistency is established between the first algorithm and the second algorithm, the first parameter to be used together with the second algorithm.

Item 2

The migration system of a learning model for cell image analysis according to Item 1, in which the first learning device may include a first learning device storage unit that stores the learning model migration information, and a migration information output unit that outputs the learning model migration information stored in the first learning device storage unit.

Item 3

The migration system of a learning model for cell image analysis according to Item 2, in which the learning model migration information may further include preprocessing program specification information for specifying a first preprocessing program, which is a preprocessing program for the cell image when the learning model is trained, the second learning device storage unit may be configured to further store a second preprocessing program, which is a preprocessing program for the cell image, and the second learning device may further include a preprocessing program consistency determination unit that determines, based on the preprocessing program specification information and the second preprocessing program stored in the second learning device storage unit, whether or not consistency is established for results of performing preprocessing with respect to the cell image between the first preprocessing program and the second preprocessing program.

Item 4

The migration system of a learning model for cell image analysis according to Item 3, in which the learning model migration information may further include a second parameter corresponding to the first preprocessing program, and a preprocessing parameter setting unit that sets the second parameter with respect to the second preprocessing program when the consistency is established for the results of performing the preprocessing between the first preprocessing program and the second preprocessing program, may be further provided.

Item 5

The migration system of a learning model for cell image analysis according to any one of Items 2 to 4, in which the learning model migration information may further include at least one of a name of dataset used for training the learning model, the number of images of the cell images used for training the learning model, a ratio of training data, verification data, and test data in data used for training the learning model, a size of the cell image used for training the learning model, and an index value at a time of training the learning model.

Item 6

The migration system of a learning model for cell image analysis according to any one of Items 2 to 4, in which the first learning device may further include a migration information encryption unit that encrypts the learning model migration information stored in the first learning device storage unit, the migration information output unit may be configured to output the learning model migration information encrypted by the migration information encryption unit, and the migration information input reception unit may be configured to decrypt the learning model migration information encrypted by the migration information encryption unit.

Item 7

The migration system of a learning model for cell image analysis according to any one of Items 1 to 5, in which regarding the first algorithm specification information, when a version of the first algorithm is upgraded, the first algorithm specification information after upgrading the version may include a compatible version of the first algorithm specification information, regarding the second algorithm specification information, when a version of the second algorithm is upgraded, the second algorithm specification information after upgrading the version may include a compatible version of the second algorithm specification information, and the algorithm consistency determination unit may be configured to, even when the versions of the first algorithm and the second algorithm are different from each other, determine that the consistency is established between the first algorithm and the second algorithm when the first algorithm and the second algorithm are compatible with each other.

Item 8

The migration system of a learning model for cell image analysis according to any one of Items 1 to 6, in which the first algorithm specification information may include first identification information corresponding to the first algorithm, the second algorithm specification information may include second identification information corresponding to the second algorithm, and the algorithm consistency determination unit may be configured to determine the consistency between the first algorithm and the second algorithm by determining whether or not the first identification information and the second identification information match.

Item 9

The migration system of a learning model for cell image analysis according to Item 8, in which the first identification information may include a first hash value generated based on the first algorithm, the second identification information may include a second hash value generated based on the second algorithm, and the algorithm consistency determination unit may be configured to determine whether or not the first hash value and the second hash value match.

Item 10

A migration method of a learning model for cell image analysis of migrating a learning model used for analyzing a cell image from a first computer to a second computer, the migration method includes: receiving an input of learning model migration information including first algorithm specification information for specifying a first algorithm of the learning model used for analyzing the cell image and a first parameter, which is output when the learning model is generated and is a learning parameter when the cell image is analyzed by using the learning model, by the second computer; determining, based on a second algorithm stored in a storage unit and the first algorithm specification information included in the learning model migration information, whether or not consistency is established for estimation results, which are obtained when the first parameter is used, between the first algorithm and the second algorithm, by the second computer; making a notification of whether or not the consistency is established between the first algorithm and the second algorithm, by the second computer; and setting, when the consistency is established between the first algorithm and the second algorithm, the first parameter to be used together with the second algorithm, by the second computer.

Item 11

The migration method of a learning model for cell image analysis according to Item 10, the migration method may further include: generating the learning model migration information before receiving the input of the learning model migration information by the second computer and storing the learning model migration information, by the first computer; and outputting the stored learning model migration information before receiving the input of the learning model migration information by the second computer, by the first computer.

What is claimed is:

1. A migration system of a learning model for cell image analysis that migrates a learning model used for analyzing a cell image from a first learning device to a second learning device, wherein the second learning device includes
   a migration information input reception unit that receives an input of learning model migration information including first algorithm specification information for specifying a first algorithm of the learning model used for analyzing the cell image and a first parameter, which is output when the learning model is generated and is a learning parameter when the cell image is analyzed by using the learning model,
   a second learning device storage unit that stores a second algorithm of the learning model used for analyzing the cell image,
   an algorithm consistency determination unit that determines, based on second algorithm specification information for specifying the second algorithm stored in the second learning device storage unit and the first algorithm specification information, whether or not consistency is established for estimation results, which are obtained when the first parameter is used, between the first algorithm and the second algorithm,
   a notification unit that makes a notification of whether or not the consistency is established between the first algorithm and the second algorithm, and
   a learning model parameter setting unit that sets, when the consistency is established between the first algorithm and the second algorithm, the first parameter to be used together with the second algorithm.

2. The migration system of a learning model for cell image analysis according to claim 1, wherein
the first learning device includes
   a first learning device storage unit that stores the learning model migration information, and a migration information output unit that outputs the learning model migration information stored in the first learning device storage unit.

3. The migration system of a learning model for cell image analysis according to claim 2, wherein the learning model migration information further includes preprocessing program specification information for specifying a first preprocessing program, which is a preprocessing program for the cell image when the learning model is trained, the second learning device storage unit is configured to further store a second preprocessing program, which is a preprocessing program for the cell image, and the second learning device further includes a preprocessing program consistency determination unit that determines, based on the preprocessing program specification information and the second preprocessing program stored in the second learning device storage unit, whether or not consistency is established for results of performing preprocessing with respect to the cell image between the first preprocessing program and the second preprocessing program.

4. The migration system of a learning model for cell image analysis according to claim 3, wherein the learning model migration information further includes a second parameter corresponding to the first preprocessing program, and a preprocessing parameter setting unit that sets the second parameter with respect to the second preprocessing program when the consistency is established for the results of performing the preprocessing between the first preprocessing program and the second preprocessing program, is further provided.

5. The migration system of a learning model for cell image analysis according to claim 2, wherein the learning model migration information further includes at least one of a name of dataset used for training the learning model, the number of images of the cell images used for training the learning model, a ratio of training data, verification data, and test data in data used for training the learning model, a size of the cell image used for training the learning model, and an index value at a time of training the learning model.

6. The migration system of a learning model for cell image analysis according to claim 2, wherein the first learning device further includes a migration information encryption unit that encrypts the learning model migration information stored in the first learning device storage unit, the migration information output unit is configured to output the learning model migration information encrypted by the migration information encryption unit, and the migration information input reception unit is configured to decrypt the learning model migration information encrypted by the migration information encryption unit.

7. The migration system of a learning model for cell image analysis according to claim 1, wherein regarding the first algorithm specification information, when a version of the first algorithm is upgraded, the first algorithm specification information after upgrading the version includes a compatible version of the first algorithm specification information, regarding the second algorithm specification information, when a version of the second algorithm is upgraded, the second algorithm specification information after upgrading the version includes a compatible version of the second algorithm specification information, and the algorithm consistency determination unit is configured to, even when the versions of the first algorithm and the second algorithm are different from each other, determine that the consistency is established between the first algorithm and the second algorithm when the first algorithm and the second algorithm are compatible with each other.

8. The migration system of a learning model for cell image analysis according to claim 1, wherein the first algorithm specification information includes first identification information corresponding to the first algorithm, the second algorithm specification information includes second identification information corresponding to the second algorithm, and the algorithm consistency determination unit is configured to determine the consistency between the first algorithm and the second algorithm by determining whether or not the first identification information and the second identification information match.

9. The migration system of a learning model for cell image analysis according to claim 8, wherein the first identification information includes a first hash value generated based on the first algorithm, the second identification information includes a second hash value generated based on the second algorithm, and the algorithm consistency determination unit is configured to determine whether or not the first hash value and the second hash value match.

10. A migration method of a learning model for cell image analysis of migrating a learning model used for analyzing a cell image from a first computer to a second computer, the migration method comprising:

receiving an input of learning model migration information including first algorithm specification information for specifying a first algorithm of the learning model used for analyzing the cell image and a first parameter, which is output when the learning model is generated and is a learning parameter when the cell image is analyzed by using the learning model, by the second computer;

determining, based on a second algorithm stored in a storage unit and the first algorithm specification information included in the learning model migration information, whether or not consistency is established for estimation results, which are obtained when the first parameter is used, between the first algorithm and the second algorithm, by the second computer;

making a notification of whether or not the consistency is established between the first algorithm and the second algorithm, by the second computer; and setting, when the consistency is established between the first algorithm and the second algorithm, the first parameter to be used together with the second algorithm, by the second computer.

11. The migration method of a learning model for cell image analysis according to claim 10, the migration method further comprising:

generating the learning model migration information before receiving the input of the learning model migration information by the second computer and storing the learning model migration information, by the first computer; and outputting the stored learning model migration information before receiving the input of the learning model migration information by the second computer, by the first computer.

\* \* \* \* \*